United States Patent
Takeuchi et al.

(10) Patent No.: US 9,581,781 B2
(45) Date of Patent: Feb. 28, 2017

(54) PATCH PANEL PIVOTING TRAY CABLE RETENTION MECHANISMS

(71) Applicant: Go!Foton Holdings, Inc., Somerset, NJ (US)

(72) Inventors: Kenichiro Takeuchi, North Brunswick, NJ (US); Haiguang Lu, Los Altos, CA (US)

(73) Assignee: Go!Foton Holdings, Inc., Somerset, NJ (US)

( * ) Notice: Subject to any disclaimer, the term of this patent is extended or adjusted under 35 U.S.C. 154(b) by 188 days.

(21) Appl. No.: 14/311,531

(22) Filed: Jun. 23, 2014

(65) Prior Publication Data

US 2014/0376870 A1    Dec. 25, 2014

Related U.S. Application Data

(60) Provisional application No. 61/838,635, filed on Jun. 24, 2013.

(51) Int. Cl.
*G02B 6/44* (2006.01)
*G02B 6/38* (2006.01)

(52) U.S. Cl.
CPC ......... *G02B 6/4452* (2013.01); *G02B 6/3897* (2013.01); *G02B 6/3825* (2013.01); *G02B 6/4453* (2013.01)

(58) Field of Classification Search
CPC .. G02B 6/3825; G02B 6/3897; G02B 6/4452; G02B 6/4453
See application file for complete search history.

(56) References Cited

U.S. PATENT DOCUMENTS 2,865,979 A    12/1958   Klassen
4,353,518 A    10/1982   Taylor et al.
(Continued)

FOREIGN PATENT DOCUMENTS

EP    0207926 A2    1/1987
EP    0795935 A2    9/1997

OTHER PUBLICATIONS

International Search Report and Written Opinion for Application No. PCT/US2013/033701 dated Sep. 2, 2013.
(Continued)

*Primary Examiner* — Daniel Petkovsek
(74) *Attorney, Agent, or Firm* — Lerner, David, Littenberg, Krumholz & Mentlik, LLP

(57) ABSTRACT

A system may facilitate access to communication connectors that are supported within a housing. The system may include one or more of the devices, which each include a connection means supporting the connectors. The system may also include a device that manages, e.g., guides and supports cables that are operatively coupled to the connectors. The patch panel device may have at least one tray engageable with the housing and having a first position within the housing and a second position pulled out of the housing. A proximal arm may have a proximal segment pivotably coupled to a distal segment. The proximal and distal segments may be pivotably coupled to the tray and the housing, respectively. The system may include a cable retainer configured to guide the cables. As the tray transitions from the first position to the second position, the tray is capable of rotating with respect to the housing.

7 Claims, 18 Drawing Sheets

(56) References Cited

U.S. PATENT DOCUMENTS

| | | | |
|---|---|---|---|
| 4,688,885 A | 8/1987 | Poteat et al. | |
| 5,100,221 A * | 3/1992 | Carney | G02B 6/4452 385/135 |
| 5,613,021 A | 3/1997 | Saito et al. | |
| 5,775,755 A | 7/1998 | Covert et al. | |
| 6,070,742 A | 6/2000 | McAnally et al. | |
| 6,263,141 B1 * | 7/2001 | Smith | G02B 6/4455 385/135 |
| 6,293,707 B1 * | 9/2001 | Wild | G02B 6/3897 385/55 |
| 6,327,139 B1 | 12/2001 | Champion et al. | |
| 6,356,697 B1 | 3/2002 | Braga et al. | |
| 6,442,030 B1 * | 8/2002 | Mammoser | G06F 1/1601 248/917 |
| 6,556,763 B1 | 4/2003 | Puetz et al. | |
| 6,902,069 B2 * | 6/2005 | Hartman | H05K 7/1491 211/26 |
| 6,925,241 B2 * | 8/2005 | Bohle | G02B 6/4455 385/134 |
| 7,335,056 B1 | 2/2008 | Clark et al. | |
| 7,352,945 B2 * | 4/2008 | Holmberg | G02B 6/4452 385/135 |
| 7,460,758 B2 * | 12/2008 | Xin | G02B 6/4452 385/134 |
| 7,746,667 B1 | 6/2010 | Baiza et al. | |
| 8,068,715 B2 | 11/2011 | Kewitsch | |
| 8,175,425 B2 | 5/2012 | Chen | |
| 8,179,684 B2 | 5/2012 | Smrha et al. | |
| 8,731,361 B2 | 5/2014 | Anderson et al. | |
| 8,939,792 B2 | 1/2015 | Takeuchi et al. | |
| 2002/0117942 A1 | 8/2002 | Audibert et al. | |
| 2004/0074852 A1 | 4/2004 | Knudsen et al. | |
| 2004/0178312 A1 * | 9/2004 | Parsons | A61G 15/10 248/276.1 |
| 2005/0111809 A1 | 5/2005 | Giraud et al. | |
| 2006/0018622 A1 | 1/2006 | Caveney et al. | |
| 2006/0162948 A1 | 7/2006 | Rinderer et al. | |
| 2007/0096606 A1 * | 5/2007 | Ryu | F16M 11/04 312/7.2 |
| 2007/0189692 A1 | 8/2007 | Zimmel et al. | |
| 2007/0230889 A1 | 10/2007 | Sato et al. | |
| 2008/0002937 A1 | 1/2008 | Spisany et al. | |
| 2008/0205843 A1 | 8/2008 | Castonguay et al. | |
| 2009/0078834 A1 | 3/2009 | Chen et al. | |
| 2009/0086441 A1 | 4/2009 | Randall et al. | |
| 2009/0238533 A1 | 9/2009 | Stansbury et al. | |
| 2010/0008623 A2 | 1/2010 | Arol et al. | |
| 2010/0054659 A1 | 3/2010 | Pnini et al. | |
| 2010/0310221 A1 | 12/2010 | Le Dissez | |
| 2010/0310225 A1 | 12/2010 | Anderson et al. | |
| 2011/0267794 A1 | 11/2011 | Anderson et al. | |
| 2011/0317971 A1 | 12/2011 | Zhang et al. | |
| 2012/0019117 A1 | 1/2012 | Dunwoody et al. | |
| 2012/0321255 A1 | 12/2012 | Kewitsch | |
| 2013/0196538 A1 | 8/2013 | Takeuchi et al. | |
| 2014/0248028 A1 | 9/2014 | Campbell et al. | |
| 2014/0262487 A1 | 9/2014 | Takeuchi et al. | |
| 2014/0348481 A1 | 11/2014 | Giraud et al. | |
| 2014/0354131 A1 | 12/2014 | Takeuchi et al. | |
| 2014/0355217 A1 | 12/2014 | Takeuchi et al. | |
| 2014/0357118 A1 | 12/2014 | Takeuchi et al. | |
| 2015/0253529 A1 | 9/2015 | Lu et al. | |
| 2015/0268436 A1 | 9/2015 | Blackwell, Jr. et al. | |
| 2015/0301298 A1 | 10/2015 | Frith et al. | |
| 2016/0047999 A1 * | 2/2016 | Alexi | H04Q 1/02 385/135 |

OTHER PUBLICATIONS

International Search Report and Written Opinion for Application No. PCT/US2014/021953 dated Jun. 25, 2014.
International Search Report for Application No. PCT/US2013/023176 dated Jun. 27, 2013.
Partial International Search Report for Application No. PCT/US2013/023176 dated May 2, 2013.
Partial International Search Report for Application No. PCT/US2013/033701 dated Jul. 11, 2013.

* cited by examiner

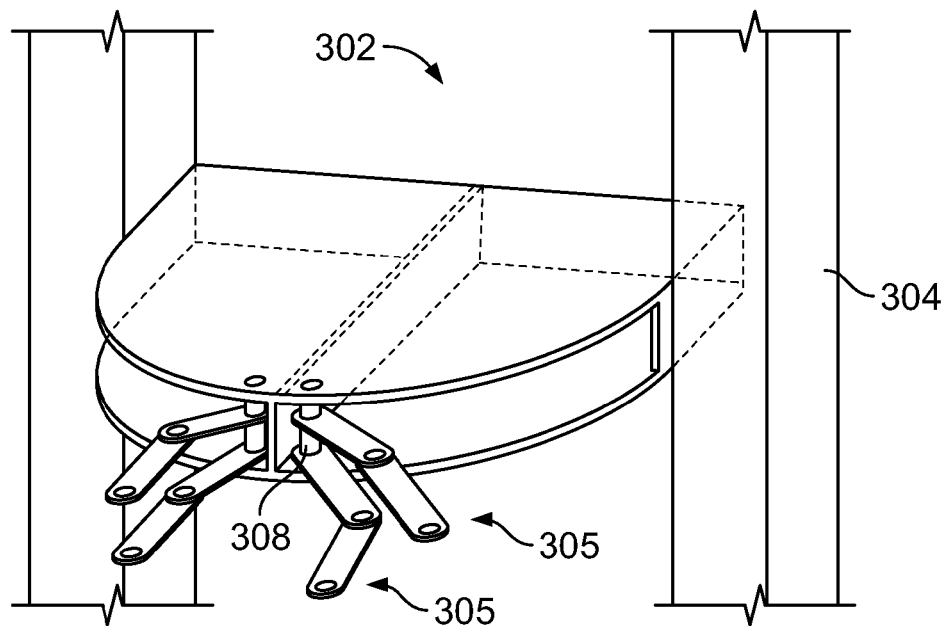
FIG. 4A
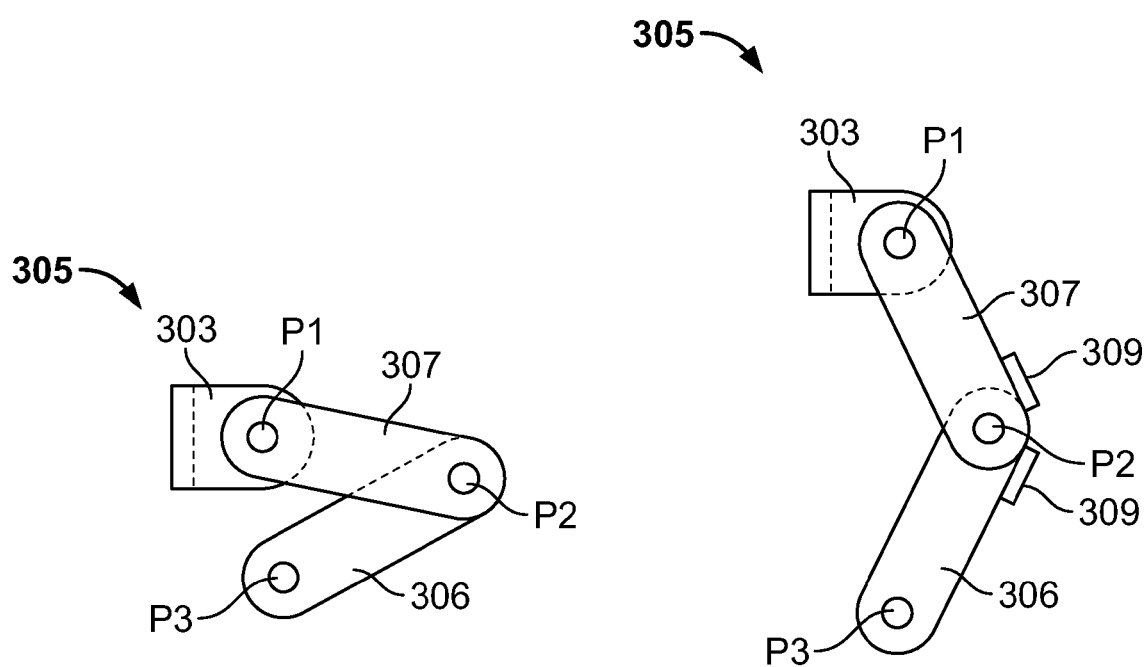
FIG. 4B
FIG. 4C

PATCH PANEL PIVOTING TRAY CABLE RETENTION MECHANISMS

CROSS-REFERENCE TO RELATED APPLICATIONS

The present application claims the benefit of the filing date of U.S. Provisional Patent Application No. 61/838,635 filed Jun. 24, 2013, the disclosure of which is hereby incorporated by reference herein.

BACKGROUND OF THE DISCLOSURE

The present disclosure generally relates to a device and a system for supporting and managing communication connectors, adapters, and/or ports. More particularly, the present disclosure relates to communication patch panel devices and systems, which facilitate access to communication connectors, adapters, and/or ports supported by the devices and systems.

In communications cabinets and racks, a multitude of cables are interconnected to one another through connectors, e.g., adapters. A cable organization unit typically has a tray or a shelf or a similar platform, which supports the connectors, e.g., adapters. Examples of cable organization units include patch panels.

A patch panel houses cable connectors and in the majority of cases is rack mounted. The patch panel typically is two-sided; the front of the patch panel provides for connections to relatively short wires or cables, and the rear of the patch panel usually provides for connection to relatively long wires or cables. This setup facilitates the performance of temporary alterations to the front of the patch panel without disturbing the connections in the rear. Sometimes, the cables connected to the front of the patch panel may interconnect different patch panels and may be relatively short or may be part of longer cables. The patch panel facilitates interconnecting, monitoring, and circuit testing of equipment without necessitating costly switching equipment.

Early applications for patch panels were for telephone exchanges, where they are still used albeit in a more automated form. Patch panels are also used extensively in the entertainment industry, e.g., in recording and television studios. They are also used in concert halls to manage connections among equipment, e.g., microphones, speakers, and other electronic equipment. Patch panels are valued for such purposes not only for their convenience and relative cost effectiveness, but also because they make it easier to identify problems such as feedback, ground loops, and static.

Traditional fiber optic cable organization units include fiber optic shelves having a single patch panel or multiple modular panels on the front patching side of the shelf. It is desirable to provide patch panels having increased connector port density, i.e., the number of locations or ports per unit volume of area for providing connections. To this end, smaller sized connectors are increasingly being utilized.

A variety of optical fiber connectors are available, with the Subscriber Connector (SC) and the Lucent Connector (LC) being the most common. The differences among the types of connectors include dimensions and methods of mechanical coupling. For instance, SC connectors use a round 2.5 mm ferrule to hold a single fiber and use a push-on/pull-off mating mechanism. The ferrule of an LC connector is half the size as that of an SC connector, measuring only 1.25 mm. LC connectors use a retaining tab mechanism, which is similar to that found on a household phone connector.

In data communication and telecommunication applications, small connectors, e.g., LC, are increasingly replacing traditional connectors, e.g., SC. The main advantage of small connectors over larger sized connectors is the ability to provide a higher number of fibers per unit of rack space. Since the LC connector is roughly half the size as the SC connector, the placement of almost twice the number of connectors is possible within the same amount of space by using the LC connector instead of the SC connector.

However, there are disadvantages associated with using smaller connectors. As more connectors are placed within the same amount of space, accessing the connectors which is often performed by hand may present a challenge. Adult fingers typically have a diameter of 16 mm to 20 mm. Some people may have larger or misshapen fingers. Therefore, the use of small connectors, such as the LC having a 1.25 mm diameter ferrule, may be especially problematic for technicians having larger or less dexterous hands. Commonly, LC connectors are held together in a duplex configuration with a plastic clip. While holding smaller sized connectors in a duplex configuration may make it easier for a technician to access and/or remove LC connectors, it also means that two connectors are necessarily affected by any given servicing procedure.

There is a continuing need for new devices and systems to facilitate access communication adapters and/or cables supported by communication patching devices and systems.

BRIEF SUMMARY

The present disclosure is generally related to communication patch panels and communication patching systems. In particular, the present disclosure is related to patch panels that facilitate both the placement of multiple, relatively small connectors in close proximity to each other and the manipulation and/or maintenance of those connectors.

In an embodiment, a communication patch panel apparatus is for coupling to at least one communication patch panel device, the device having at least one tray and a plurality of ports configured to connect to cables, the tray being engageable with a housing to have a first position substantially within the housing and a second position substantially pulled out of the housing. The apparatus may include a proximal arm having a proximal segment and a distal segment pivotably attached to the proximal segment. The distal segment may be for pivotably coupling to the housing and the proximal segment may be for pivotably coupling to the tray. The apparatus may also include a cable retainer configured to guide the cables. The apparatus is in an installed state when the proximal arm and the cable retainer are coupled to the patch panel device. When in the installed state, as the tray transitions from the first position to the second position, the tray, cable retainer, and arm may each be capable of rotating with respect to the housing.

In a further embodiment, a communication patch panel apparatus is for coupling to at least one communication patch panel device having at least one tray and a plurality of ports configured to connect to cables, the tray being engageable with a housing to have a first position substantially within the housing and a second position substantially pulled out of the housing. The apparatus may also include a support arm having a proximal segment and a distal segment pivotably attached to the proximal segment. The distal segment may be for pivotably coupled to a rack pole of the housing and the proximal segment may be for fixing to the tray. The apparatus is in an installed state when the support arm is coupled to the rack pole and fixed to the tray. When in the installed state, as the tray transitions from the first position to the second position, the tray and the support arm are capable of rotating with respect to the housing.

BRIEF DESCRIPTION OF THE DRAWINGS

By way of description only, embodiments of the present disclosure will be described herein with reference to the accompanying drawings, in which:

FIG. 4A is a front perspective view of an embodiment of a housing to which a cable management system may be coupled;

FIG. 4B is a top view of an arm of the cable management system of FIG. 4A in a first position;

FIG. 4C is a top view of the arm of FIG. 4B in a second position;

DETAILED DESCRIPTION

Figures 1A, 1B:
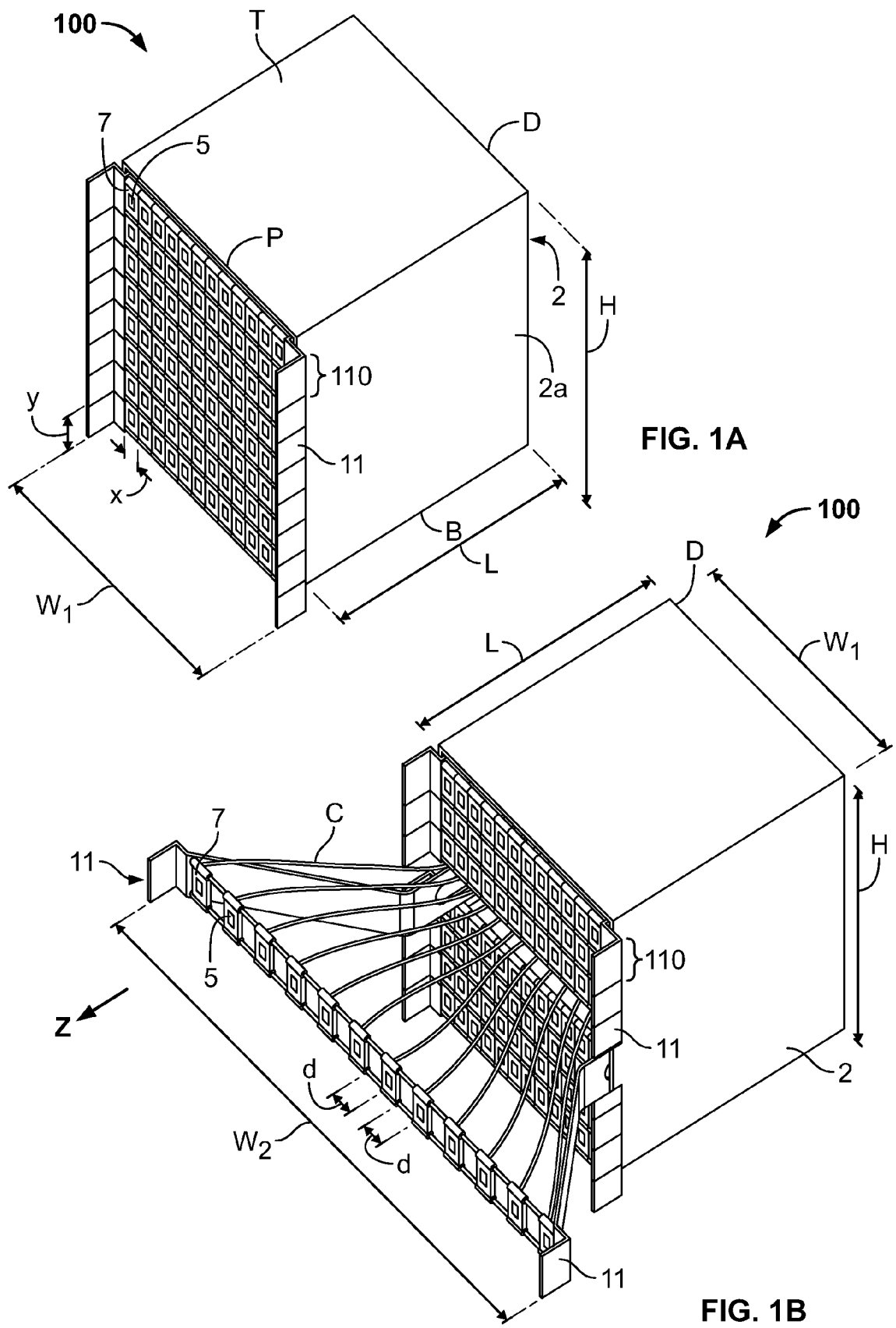
FIG. 1A is a front perspective view of a communication patching system including multiple patch panel devices shown in a first state.
FIG. 1B is the communication patching system of FIG. 1A shown in a second state.

Particular embodiments of the present disclosure are described with reference to the accompanying drawings. In the figures and in the description that follows, in which like reference numerals identify similar or identical elements, the term "proximal" refers to the end of the device that is closest to the operator or user during use, while the term "distal" refers to the end of the device that is farther from the operator or user during use. Also, the terms "clockwise" and "counterclockwise" refer to motion of an object as viewed from above.

Figure 1C:
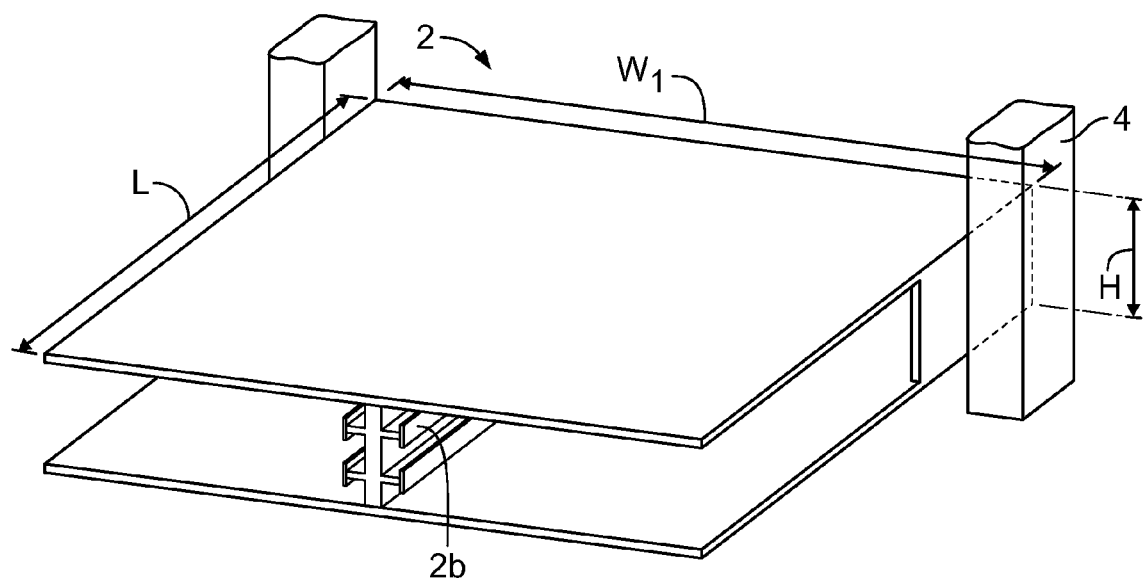
FIG. 1C is a front perspective view of a housing and rack pole, without a patch panel device placed therein.
Figure 4D:
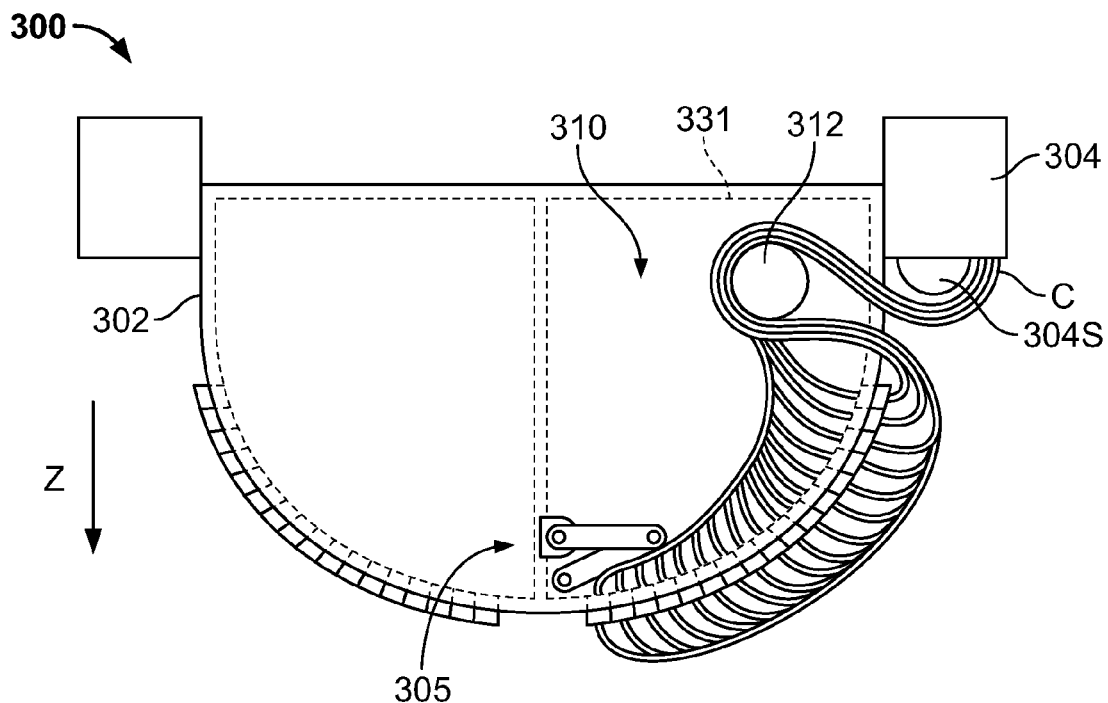
FIG. 4D is a top view of an embodiment of a communication patch panel system incorporating a cable management system in a first position coupled to a patch panel device.

Now referring to FIGS. 1A-C, a communication patching system 100 may include a housing 2, e.g., a rack or a cabinet. The housing 2 may define a length L, a height H, and a width $W_1$. The housing 2 may support one or more patch panel devices 110, with each device 110 held in vertical alignment with a guide rail 2b (FIG. 1C), a plurality of which may also be disposed in vertical alignment along at least one side of the housing 2. A rack pole 4 may be positioned adjacent to the housing 2, typically at a distal corner. A plurality of cables C may extend vertically through the rack pole 4 and a plurality of spools (illustrated in FIGS. 4D-F) may be disposed vertically along the pole 4, with one spool adjacent to each patch panel device 110 stored in the housing 2. The cables C may extend vertically through the pole 4 to the spool, and then to the patch panel device 110 in the housing 2 corresponding to the spool.

Each patch panel device 110 may include a plurality of adapters or ports 7, each port 7 having a receptacle 5 for securing a cable C (FIG. 1B) therein. The receptacle 5 of the port 7 may be operatively coupled to one or more cables C, e.g., the receptacle 5 may be in a simplex or duplex configuration. The port 7 may include a mounting portion 51 that frames the port 7 and facilitates securing of the port 7, or the receptacle 5, to connection means, e.g., rails 41, 43 (FIG. 2C). In some embodiments, the mounting portion 51 of the port 7 may be integrally formed with the port 7 or may be a separate component coupled to the receptacle 5, and in some embodiments the mounting portion 51 may form a part of a connection means to which the receptacle 5 is connected, as described below.

The patch panel device 110 may include a tab 11 on either end of the patch panel device 110 to facilitate a user grasping or handling of the patch panel device 110. The density of the number of ports 7 supported by the housing 2 may be a function of the dimensions of the housing 2. As shown in FIG. 1A, the ports 7, each of which has a width x and a height y, may be arranged in rows and columns in which the number of rows of ports 7 is directly correlated to the height H and the number of columns of ports 7 is directly correlated to the width $W_1$.

The communication patching system 100 may be transitionable between a first state (FIG. 1A) and a second state (FIG. 1B). In the first state, the one or more patch panel devices 110 may be positioned at a first location with respect to the proximal end or face P of the housing 2. As shown in FIG. 1A, the patch panel devices 110 may be substantially flush with respect to the face P of the housing 2. In the second state, one or more of the patch panel devices 110 may be moved proximally in the direction of arrow Z away from the proximal end or face P of the housing 2. As the patch panel device 110 is moved proximally, the ports 7 may be transitioned to be spaced apart from one another by a gap or spacing distance d (FIG. 1B).

Figure 2A:
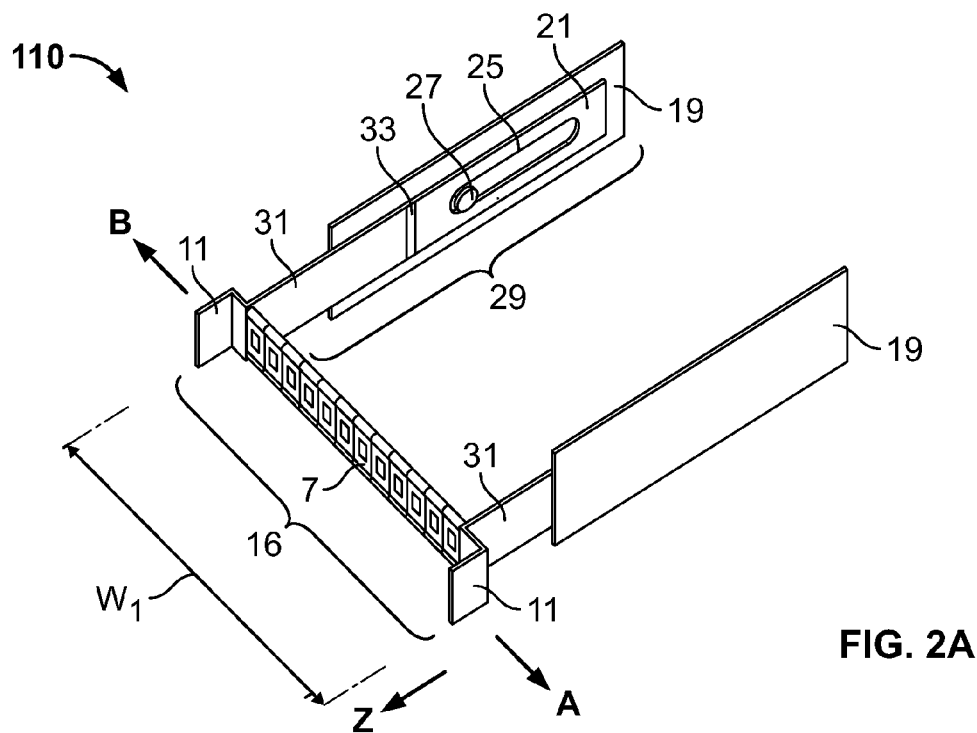
FIG. 2A is one of the patch panel devices of FIG. 1A shown in a first state.
Figure 2B:
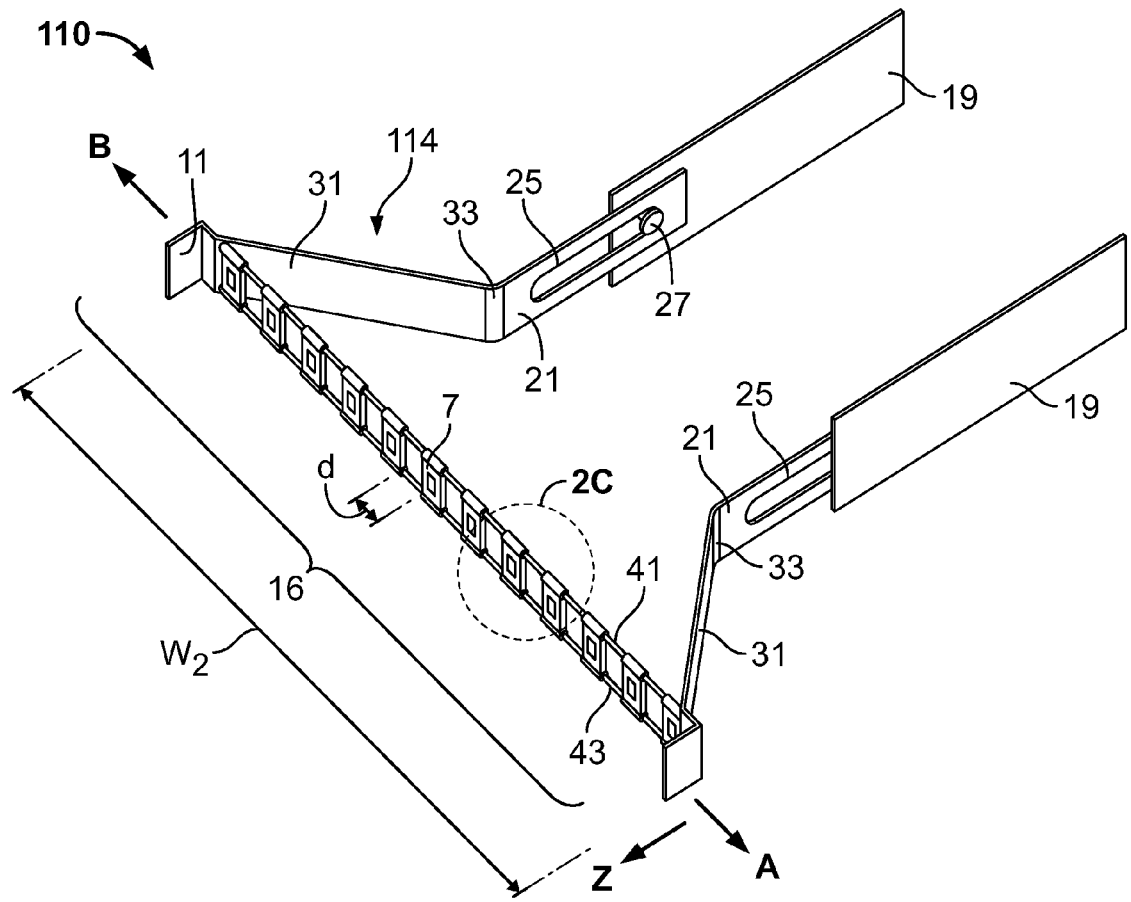
FIG. 2B is the patch panel device of FIG. 2A shown in a second state.
Figure 2C:
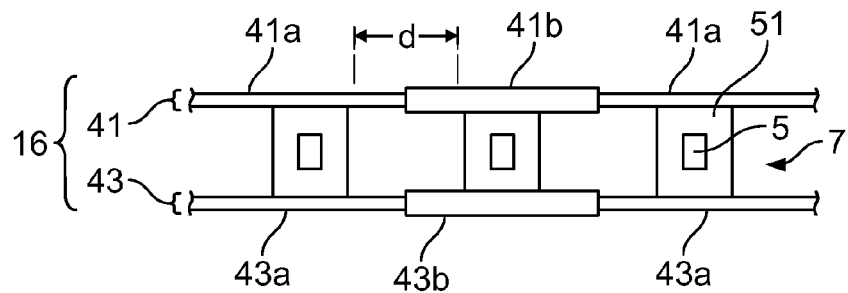
FIG. 2C is an enlarged view of the indicated area of FIG. 2B.

The patch panel device 110 may be transitionable between first and second states, as shown best in FIGS. 2A and 2B respectively. The patch panel device 110 may include bars 19, which facilitate mounting of the patch panel device within the housing 2 by securing one of the bars 19 on each of opposite sides 2a of the housing 2. A hinged arm member 114, which includes a first arm section 21 and a second arm section 31, may be slidably connected to the bar 19. The first arm section 21 may include a slot 25 which is configured and adapted to receive a pin 27 therethrough. The pin 27 may secure the first arm section 21 to the bar 19 while permitting the first arm section 21 to slide relative to the bar 19 along the length of slot 25. The first arm section 21 and the second arm section 31 of the hinged arm 114 may be pivotably connected to one another by a hinge 33, thereby facilitating the rotation of the second arm section 31 relative to the first arm section 21.

The ports 7 may be operably coupled to a connection means 16. As the connection means 16 transitions from a first length equal to width $W_1$ (FIG. 2A) to a second, expanded width $W_2$ (FIG. 2B), the ports 7 may move, or be moveable, to be positioned in a spaced apart relation. In an embodiment, the ports 7 are spaced apart. The ports 7 may be equidistantly spaced apart by equal gaps or spacing distances d. However, the spacing distances d between adjacent ports 7 may differ, i.e., be non-uniform, in the second state. In addition, individual ports 7 may be slid or moved along the length of the connection means 16, thereby facilitating adjustment of the gap or spacing distances d between adjacent ports 7 as desired by the user or technician.

It is contemplated that the hinged arm member 114 may include a lip (not shown) that interacts with a groove (not shown) defined within the bar 19 along a portion or substantially the entire length of the bar 19 to provide added stability and controlled movement of the hinged arm member 114 relative to the bar 19.

As shown best in FIG. 2C, the connection means 16 may include one or more telescopic rails 41, 43 that are slidable to adjust the overall length of the connection means 16. Although shown in FIG. 2C as having two parallel rails 41, 43, a single rail may be used. It should be noted that the greater the overall length of the connection means 16, the greater the gap or spacing distance d achievable between adjacent ports 7. Each of the parallel rails 41, 43 may include alternating sections 41a, 41b and 43a, 43b respectively. Sections 41a, 43a may be configured and adapted to slide within sections 41b, 43b respectively, where the ports 7 may be coupled to the sections 41b, 43b, to effect lengthening or shortening of the connections means 16. A resilient or biasing member (not shown) may be placed within a hollowed out center of each of the rails 41, 43 to bias the connections means 16 to one of the first or second dimensions $W_1$, $W_2$, respectively.

The sections 41b, 43b may define an open circumference such that the ports 7 will not obstruct movement of the alternating sections 41a, 41b and 43a, 43b relative to one another such that the ports 7 may be moved in closer proximity to one another. In addition, the lengths of the alternating sections 41a, 41b and 43a, 43b may be selected to facilitate placement of the ports 7 in close proximity to one another, such that adjacent ports contact each other. Each port 7 may be secured to the rails 41, 43 in a variety of ways or may be integrally formed with the rails 41, 43. It is contemplated that in other embodiments, the rails 41, 43 may be substituted with different connection means. In an embodiment, the rails 41, 43 may be substituted with elastic bands. A variety of other configurations may be used to effect lateral, angular, or other spacing between ports in a patch panel device to increase access to the ports, such as those described in greater detail in U.S. patent application Ser. Nos. 14/283,618, 14/289,812 and 14/289,871, the disclosures of which are each hereby incorporated by reference herein.

For example, another embodiment of a patch panel device is described with reference to FIGS. 3A-3D. A patch panel device 210 may include a plurality of attachment members 232 that are positioned adjacent to one another. Each attachment member 232 may include a movable member 246, which is rotatable or pivotable relative to a movable member of another attachment member 232. The movable members 246 of adjacent members 232 may be operatively coupled to one another to permit rotation of one of the movable members 246 relative to the other movable member. In an embodiment, the movable members 246 may be coupled to one another in a snap-fit connection that permits radial movement of the movable members 246 relative to one another. At least two securement members 244 may be secured to opposing ends of the plurality of attachment members 232 and secure the attachment members 232 to a tray 231. In another embodiment, a securement member 244 may be positioned between each of the movable members 232. Each of the movable members 246 may be operatively coupled to one or more cables C1, which are shown only in part. The movable member 246 may include a cable adapter or connector 249, which may include a front surface 249a that may be operatively coupled to one cable C1 and a back surface 249b that may be operatively coupled to another cable C1. The movable member 246 may include a receptacle 247 in which the connector 249 may be releasably secured such that the connector 249 may be separated from the attachment member 232.

The movable members 246 may be positioned spaced a distance from an edge 231a of the tray 231 to permit the movable members 246 to rotate relative to the tray 231. In one embodiment, the tray 231 may include a cut-out (not shown) at the movable members to facilitate a range of movement of the movable members 246 relative to the tray 231. The tray 231 may have an axis z extending along its length, an axis y extending along its height, and an axis x extending its width. The securement member 244 may be coaxially aligned with the axis z extending along the length of the tray 231. A plurality of securement members 244 may be positioned in a row extending along axis x along the width of the tray 231.

Figure 3A:
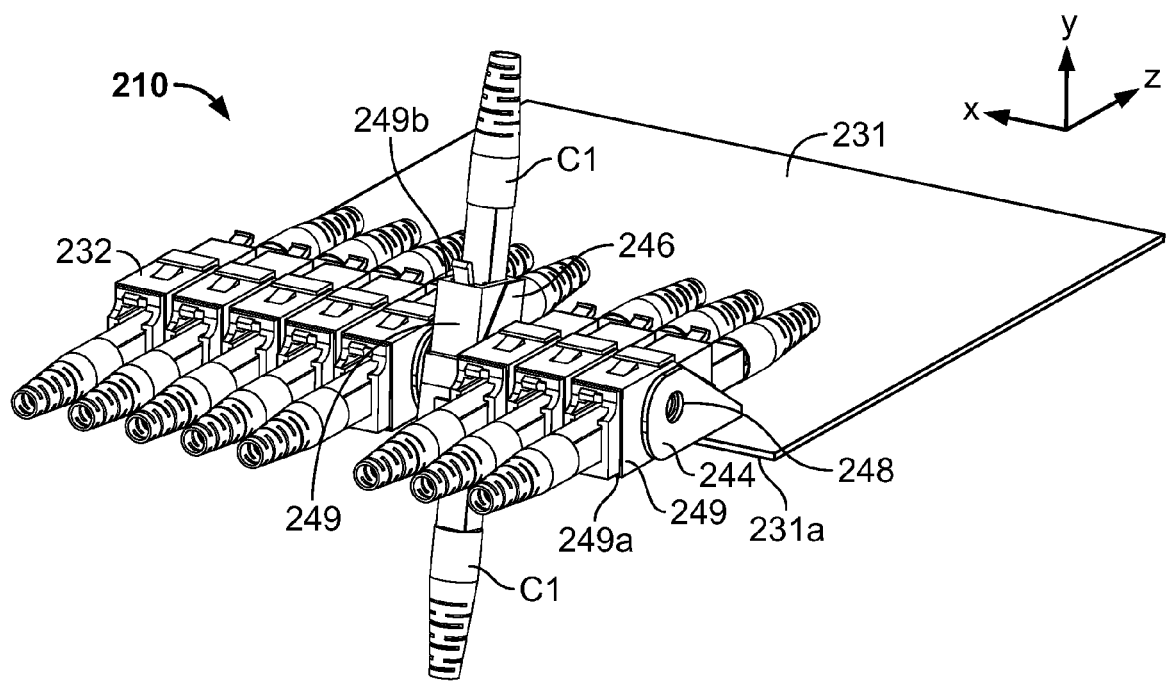
FIG. 3A is a perspective view of another embodiment of a patch panel device including a plurality of attachment members.
Figure 3B:
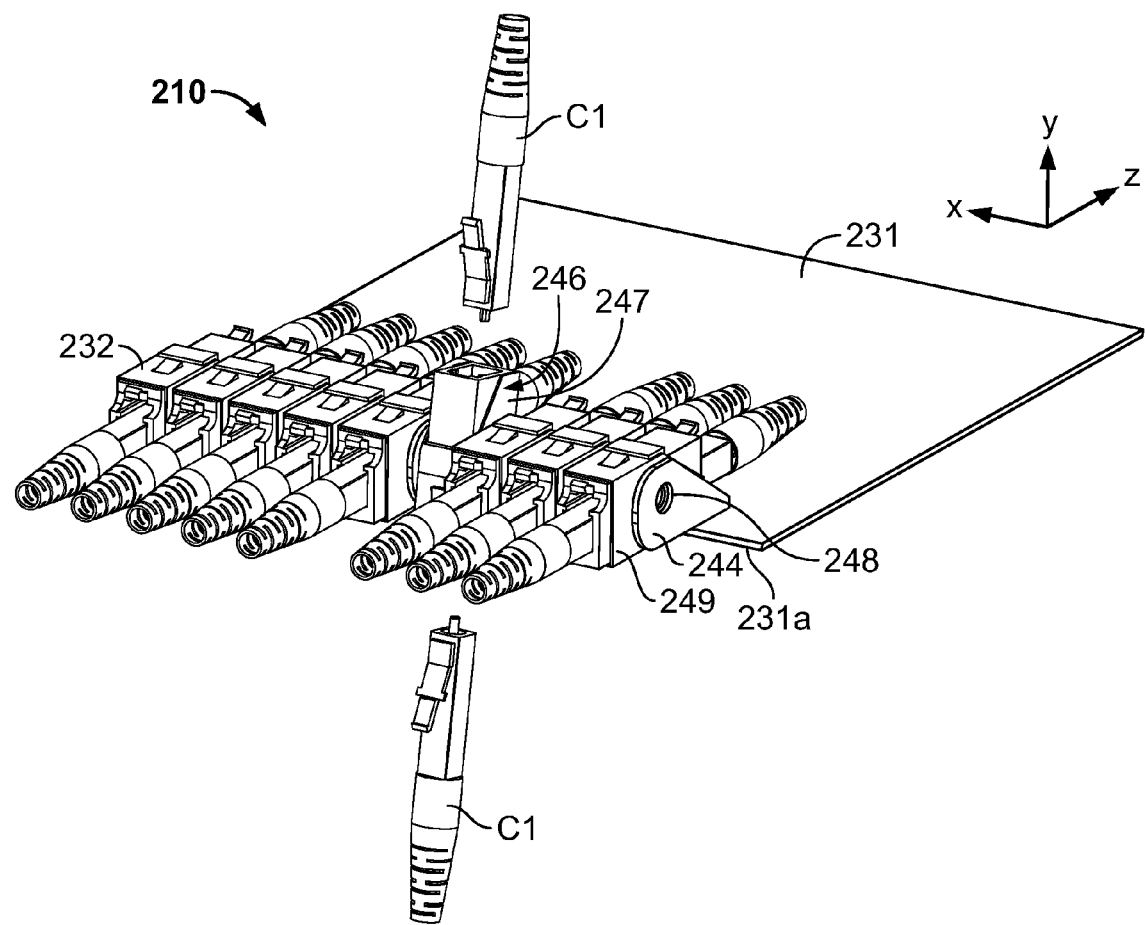
FIG. 3B is a perspective view of the patch panel device of FIG. 3A in which cables have been separated from one of the attachment members.
Figure 3C:
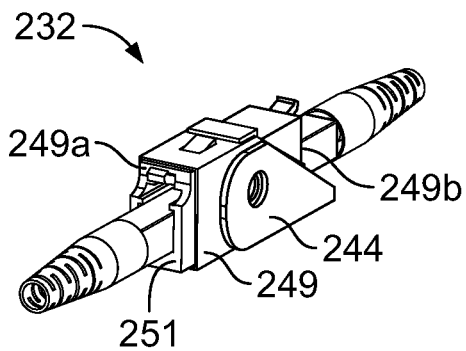
FIG. 3C is a perspective view of one of the attachment members of FIG. 3A shown in a first condition.
Figure 3D:
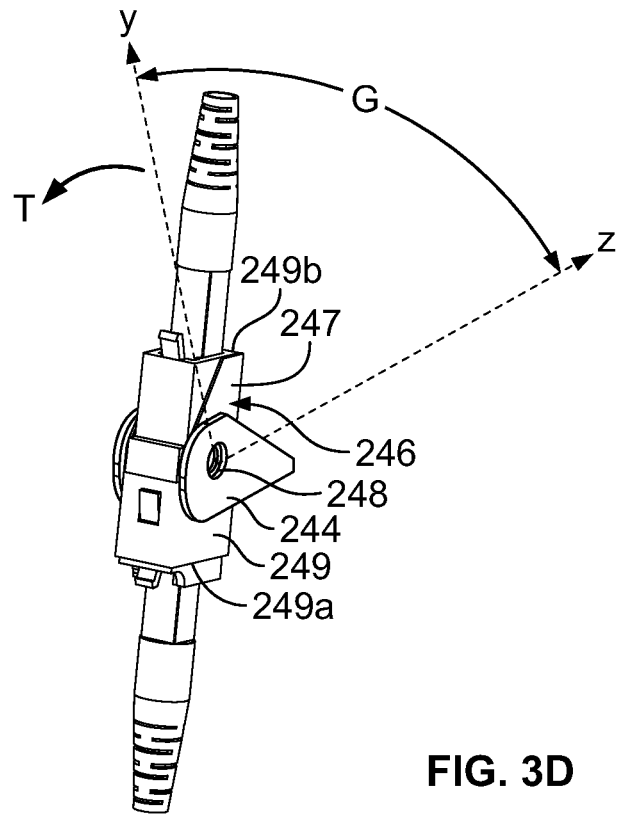
FIG. 3D is a perspective view of one of the attachment members of FIG. 3A shown in a second condition.

As shown in FIGS. 3C-3D, the securement member 244 and a movable member 246 of the attachment member 232 may be pivotably connected to one another at a pivot point 248 such that the movable member 246 may be radially moved relative to the securement member 244 to define an angle G therebetween. In particular, the movable member 246 may radially pivot between the y and z axes and the angle G may be defined therebetween. When secured to the tray 231, the movable member 246 may pivot in a counterclockwise direction T, but may be inhibited from pivoting in the opposite, clockwise direction by the tray 231. However, as discussed above, cut-outs in the tray 231 may reduce the interaction between the tray 231 and the movable member 246 to facilitate a greater range of movement of the movable member 246 with respect to the tray 231. In an embodiment, the angle G may be adjusted within a range between about 0 and about 135 degrees. In another embodiment, the angle G may be adjusted within a range between about 0 and about 90 degrees. For example, in one embodiment, the movable members 246 may be movable relative to one another to transition the patch panel device 210 between a first condition in which front surfaces 251 of the movable members 246 are substantially coplanar, and adjacent ones of the members 246 are spaced apart a first distance or contact each other, and a second condition in which the front surfaces 251 of respective adjacent members 246 are in different planes in accordance with the angle G that one of the adjacent members 246 is pivoted or rotated relative to the other adjacent members 246, where the other member 246 may or may not be at the same position as in the first condition.

A plurality of patch panel devices 210 may also be supported within housing 2 (see FIGS. 1A-C), and may be translatable into or out from the housing 2 in a direction along axis z. Once spaced apart from the housing 2, the movable member 246 may be pivoted with respect to the securement member 244, thereby spacing the surfaces 249a, 249b of the connector 249 from any adjacent connector 249 such that the cables C1 may be more accessible and readily grasped by a user to detach the cable C1 from the cable adapter or connector 249 of the movable member 246 (as shown in FIG. 3B).

A number of communication patch panel systems incorporating cable management systems for managing cables are described in connection with FIGS. 4A-8D. As with patch panel devices described above, as the patch panel devices are translated away from the face of the housing, at least a portion of the cables extending from the rack pole will correspondingly move. It may be desirable that the movement of the cables be controlled and managed such that the cables, when bent, have at least a minimum bending radius, and also to inhibit the cables from interfering with the translation of the patch panel device with respect to the housing.

Generally, the communication patch panel systems incorporating cable management systems described below allow the patch panel devices to transition from a first position substantially within the housing, through a range of intermediate positions, and to a second position substantially outside the housing. The cable management systems described herein facilitate organized movement and storage of the cables in each position and during transition from the first position to the second position.

One embodiment of a communication patch panel system 300 incorporating a cable management system is illustrated in FIGS. 4A-F. Communication patch panel system 300, as well as other communication patch panel systems with cable management systems described herein, may be used with any suitable patch panel device and housing, including suitable devices and housings described herein and suitable devices and housings described in U.S. patent application Ser. Nos. 14/283,618, 14/289,812 and 14/289,871.

In communication patch panel system 300, the patch panel device 310 is adapted to pivotably engage a housing 302 (FIG. 4A) via a pair of pivot arms 305. Housing 302 may include an arcuate proximal face with rack poles 304 and spools 304S on either side of housing 302. Rack poles 304 may align with a distal side of housing 302 so that they are flush with the distal side of housing 302, but such positioning is not necessary. Although one portion of housing 302 is illustrated in FIG. 4A for purposes of clarity, it should be understood that multiple portions may be arranged in a stacked configuration. The portion illustrated includes two compartments, each compartment capable of housing a patch panel device 310. It should be understood that components described in relation to one compartment of housing 302 and a patch panel device 310 positioned therein may be equally applicable to the adjacent compartment, although structures may be have a reversed structure and/or operation.

At least one arm 305 may be attached to a proximal side of the housing 302 by a connection rod 308 (FIG. 4A) and pivotally engaged with a tray 331. Each arm 305 may include a proximal segment 306 and a distal segment 307. The arms 305 (FIG. 4B-4C) may each include first, second, and third pivot points P1, P2, and P3, respectively. The arm 305 is pivotally attached to a proximal portion of the housing 302 at the first pivot point P1, through the connection rod 308 (FIG. 4A) extending through the distal segment 307 at the point P1 and a hole of a flange 303 extending from the proximal side of the housing 302. The proximal and distal segments 306, 307 may be pivotably engaged with each other at the second pivot point P2. The arm 305 may be pivotably attached to a proximal portion of the patch panel device 310 at the third pivot point P3, such as by a bolt extending through the arm 305 at the point P3 and then fixed to (and also extending through) the tray 331. As illustrated, one arm 305 may be positioned below patch panel device 310 and another arm 305 may be positioned above patch panel device 310 to provide additional support. It should be understood that a single arm 305 per patch panel device 310, either above or below, may be suitable.

The arms 305 may include a limiting means 309 (FIG. 4C) to control the range of pivoting motion of proximal section 306 with respect to distal section 307 about second pivot point P2, in order to ensure proper transition of the patch panel device 310 from a first position (FIG. 4D) to a second position (FIG. 4F), and vice versa. As illustrated, the limiting means 309 includes a first block on proximal section 306 and a second block on distal section 307, such that the blocks contact one another during rotation of proximal section 306 with respect to distal section 307, limiting further rotation upon contact of the blocks. However, other structures may be suitable for similarly limiting the motion of arms 305. Further, although limiting means 309 are only illustrated to limit movement about second pivot point P2, similar limiting means (not shown) may be used to limit relative motion between proximal segment 306 and tray 331, as well as between distal segment 307 and housing 302. For example, limiting means may prevent the tray 331 from being pulled completely out of the housing, ensuring at least some portion of the tray remains within the housing to help support the weight of the patch panel device 310.

Figure 4E:
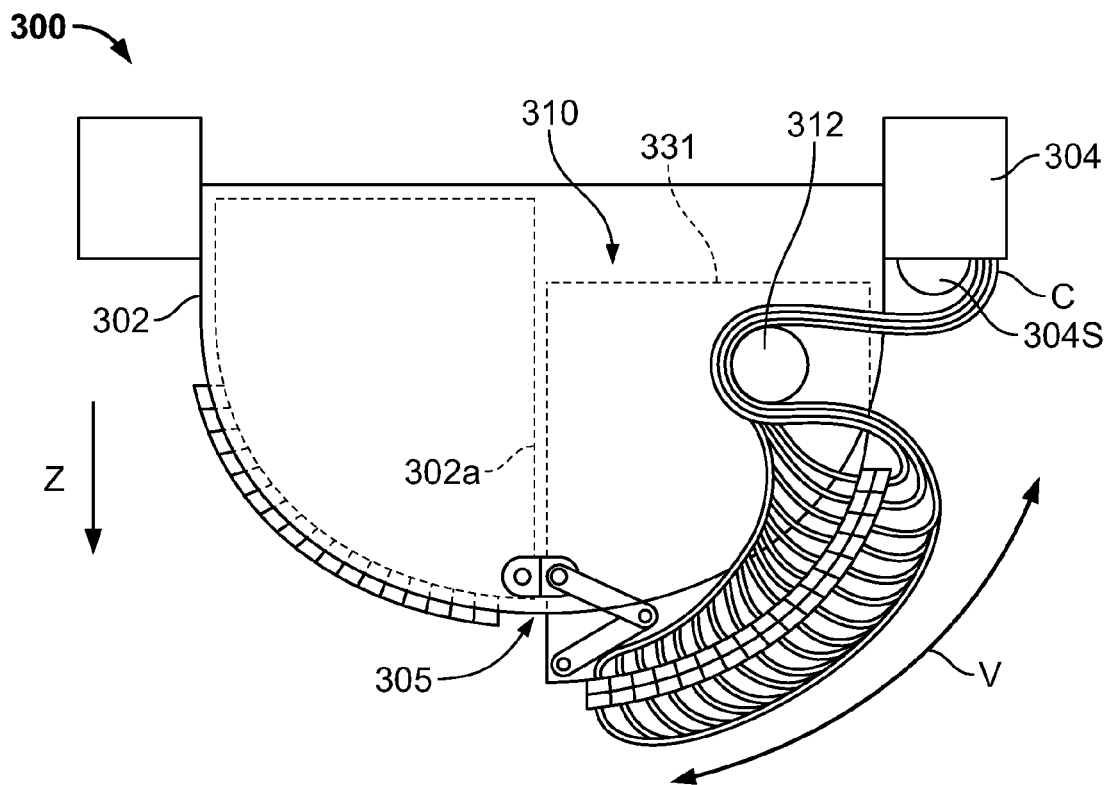
FIG. 4E is a top view of the communication patch panel system of FIG. 4D at a transition position between the first position and a second position.
Figure 4F:
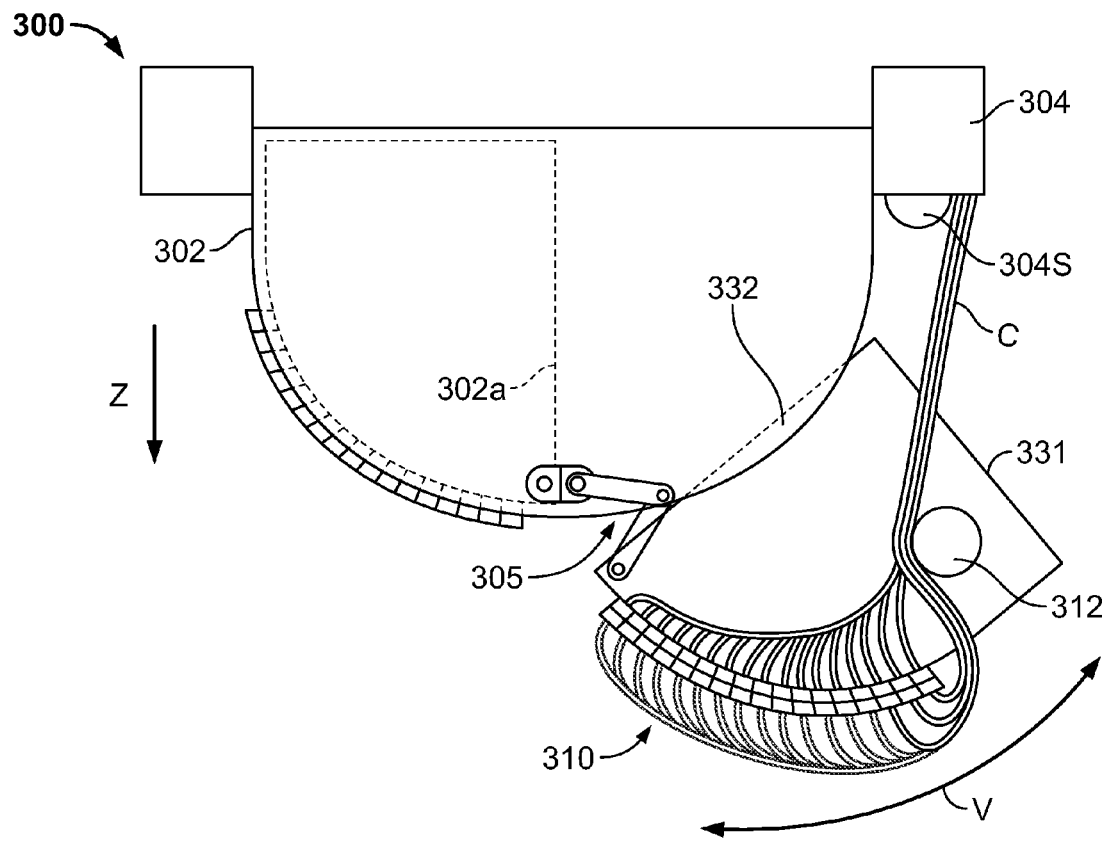
FIG. 4F is a top view of the communication patch panel system of FIG. 4D in the second position.

In addition to guiding transition of the patch panel device 310 between a first position (FIG. 4D) and second position (FIG. 4F), the arms 305 may serve as a support mechanism for holding the device 310. In one embodiment, unhindered access to the proximal face of the device 310 may be provided in the second position (FIG. 4F), and a portion 332 of tray 331 may continuously be within the housing 304 throughout operation (i.e., at all positions) of the communication patch panel system 300. Tray portion 332 is best illustrated in FIG. 4F. Thus, to provide further support to the device 310 when in the second position, at least part of the portion 332 of tray 331 may include a smooth sheet or plate, similar to the plates described in more detail in U.S. patent application Ser. No. 14/289,871, disposed along a bottom surface of tray portion 332, to contact a portion of a patch panel device or a surface of the housing 304 adjacently below. The plate may allow the tray to slide relatively effortlessly over objects below while providing a surface at which the tray may be supported by means of an underlying element, e.g., an underlying tray or a surface of the housing adjacently below.

The cable management system of communication patch panel system 300 may include a cable retainer 312 fixedly coupled to a distal portion of tray 331 of the patch panel device 310, the retainer 312 being translationally fixed with respect to tray 331. The retainer 312 may be shaped and positionable with the tray 331 relative to the distal side of the housing 302, such that at any position of the retainer 312 relative to the housing 2, any portion of a cable C extending along or in tension against the retainer 312 has at least a minimum radius of curvature, thereby avoiding damage to the cable C and/or maintaining a desired level of optical energy transmittance through the cable C. The retainer 312 may have an outer surface that is substantially smooth and/or may be rotatably mounted to tray 331, in order to avoid friction between the cable C and the retainer 312 when the cable C moves along or over the outer surface of the retainer 312.

In an exemplary operation, tray 331 may be pulled from the housing 302 in direction Z. The movement of the tray 331 may be guided by a side wall 302a of the housing 302 and also by the clockwise rotation of the distal arm segment 307 about first pivot point P1 and the counterclockwise rotation of the proximal arm segment 306 about second pivot point P2. As shown in FIGS. 4E-F, tray 331 may be pulled from housing 302 a sufficient distance in direction Z to clear any obstruction, such as may be caused by the side wall 302a or the pole 304, to a pivot path illustrated by path V, at which point the tray 331 may move clockwise along path V to the second position (FIG. 4F), guided substantially by the clockwise rotation of tray 331 about the third pivot point P3.

When the tray 331 is transitioned to the first position (FIG. 4D) from the second position (FIG. 4F), the tray 331 may first rotate counterclockwise about third pivot point P3, which guides the tray 331 counterclockwise along the path V. Once tray 331 is rotated to a position so opposing sides of the tray are substantially longitudinally aligned with the opposing sides of the housing 302, the tray 331 may be pushed into housing 302 in a direction opposite direction Z.

A second embodiment of a communication patch panel system 400 incorporating a cable management system is shown in FIGS. 5A-D. Patch panel device 410 may be pivotally engaged with housing 402 (FIG. 5A) through a pair of proximal arms 405 and a pair of distal arms 415. Proximal arms 405 may be similar or identical in structure to arms 305, each proximal arm 405 having a proximal section, a distal section, three pivot points, and a rod 408 coupling the arms 405 to the housing 402. Proximal arms 405 may also be similar or identical in function to arms 305, providing support for, and guiding movement of, patch panel device 410 and tray 431.

Each distal arm 415 maybe similar or identical to the proximal arms 405, although sizes and shapes of the components of distal arms 415 may vary in relation to proximal arms 405 to support the function thereof. For example, each distal arm 415 may include a proximal segment 416 and a distal segment 417. The arms 415 each include first, second, and third pivot or rotation points R1, R2, and R3, respectively. The arms 415 are pivotably attached to a distal portion of the housing 402 at the first pivot point R1, for example by a connection rod similar to rod 408 extending through the distal segment 417 at the point R1 and a hole of a flange extending from the distal side of the housing 402. The proximal and distal segments 416, 417 may be pivotably engaged with each other at the second pivot point R2. The arm 415 may be pivotally attached to a distal portion of the patch panel device 410 at the third pivot point R3, such as by a bolt extending through the arm 415 at the point R3 and then fixed to (and also extending through) the tray 431. Additionally, the arms 415 may include a limiting means similar or identical to limiting means 309 of arms 305.

Figure 5A:
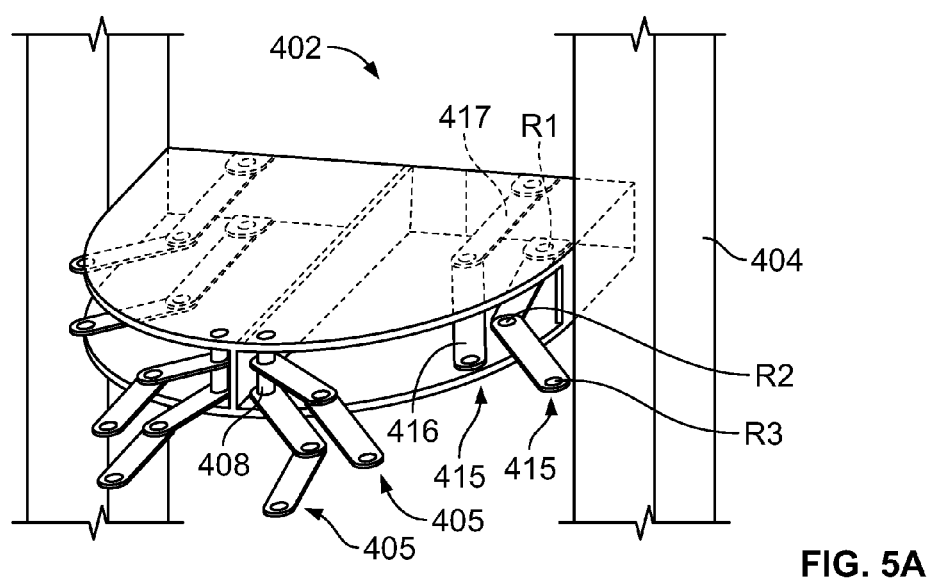
FIG. 5A is a front perspective view of another embodiment of a housing to which another cable management system may be coupled.
Figure 5B:
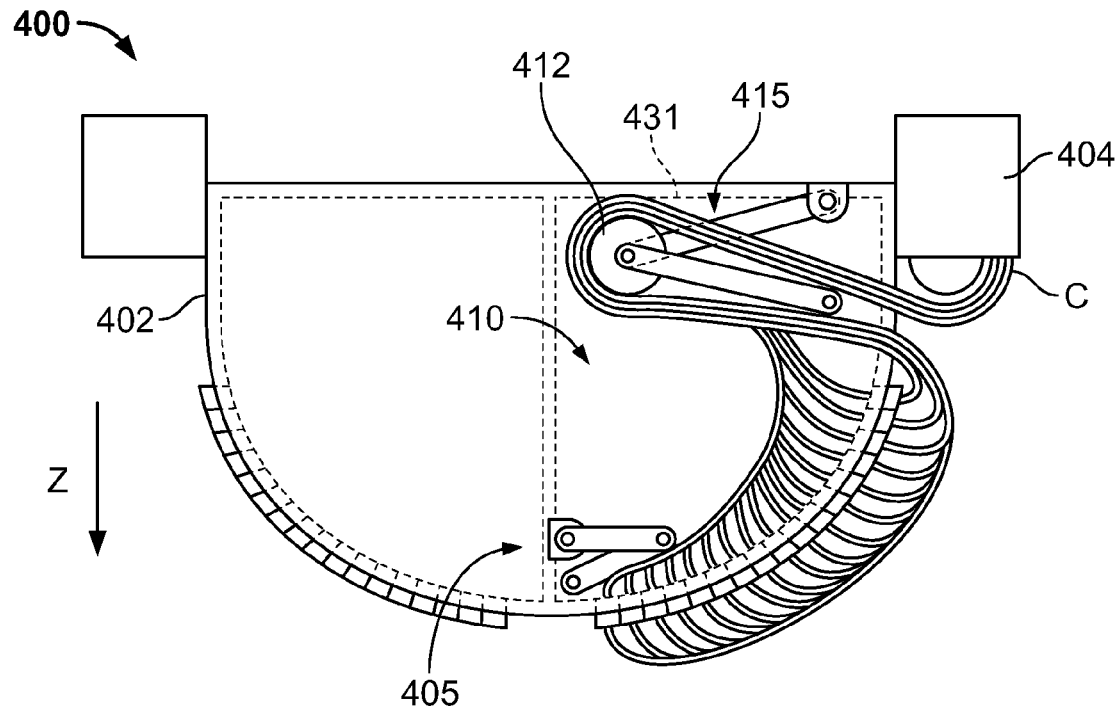
FIG. 5B is a top view of another embodiment of a communication patch panel system incorporating a cable management system in a first position coupled to a patch panel device.
Figure 5C:
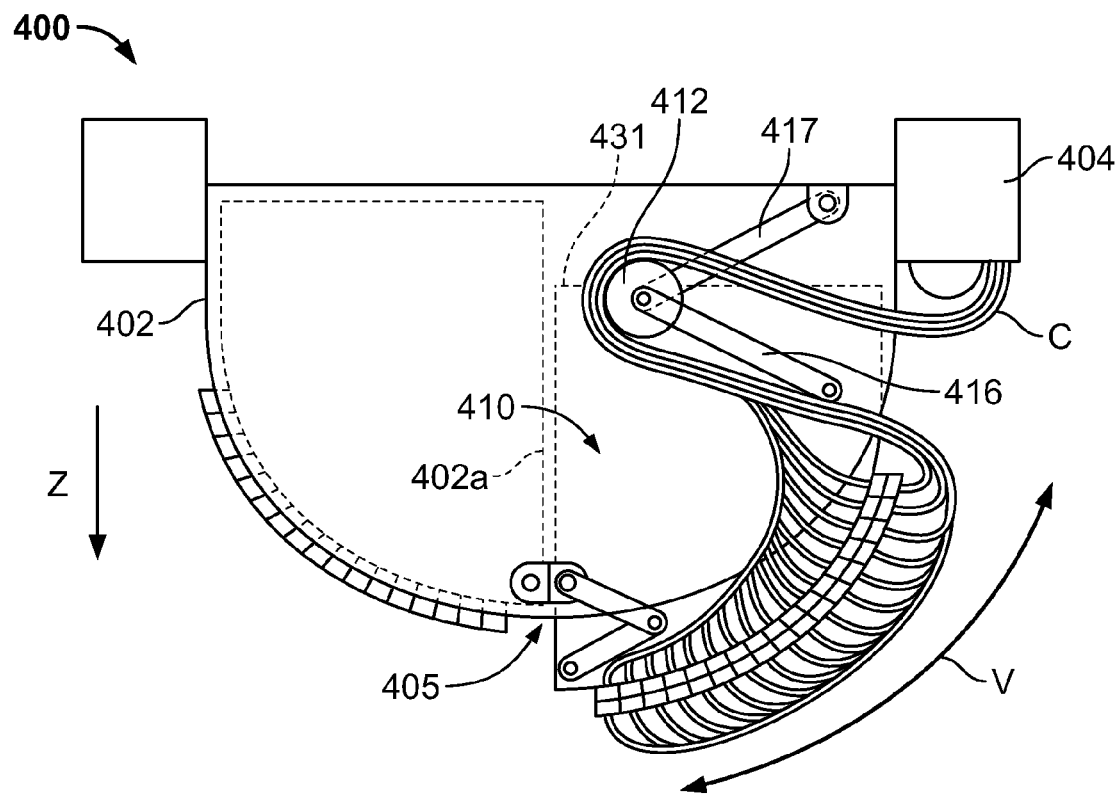
FIG. 5C is a top view of the communication patch panel system of FIG. 5B at a transition position between the first position and a second position.
Figure 5D:
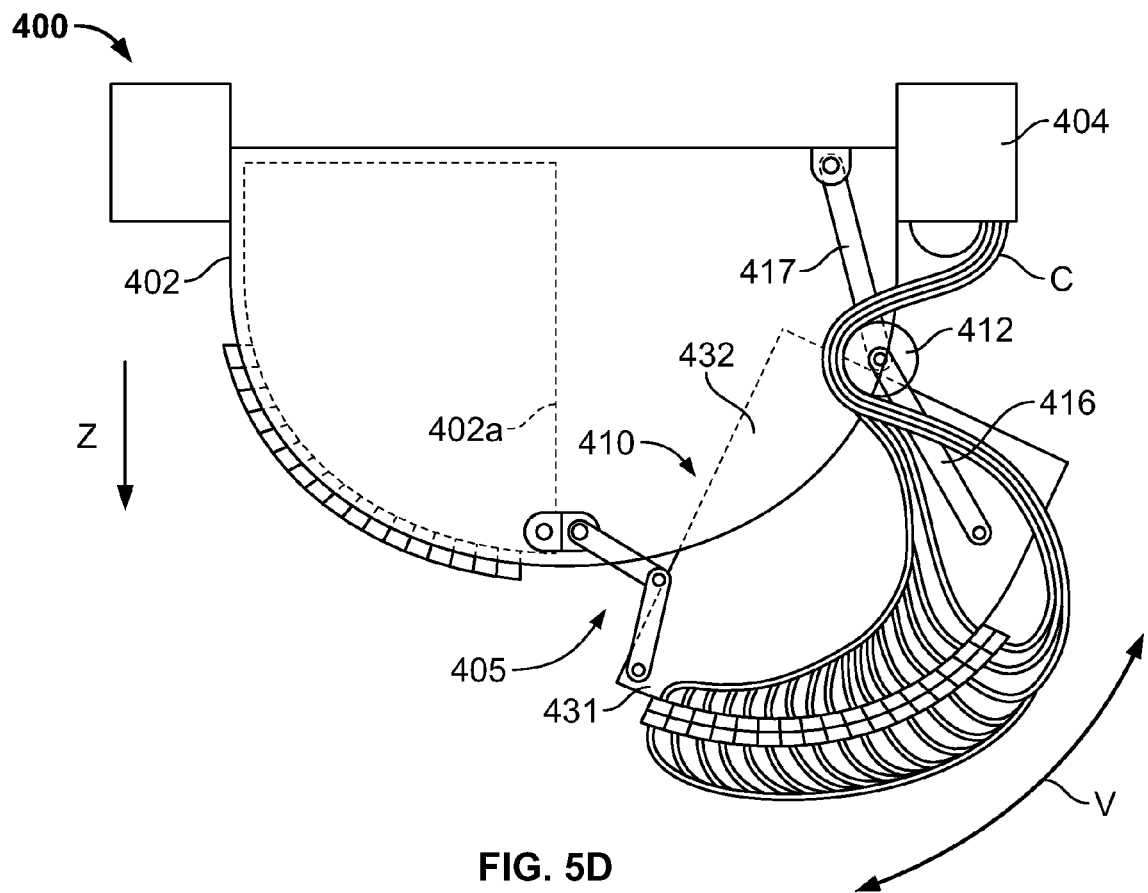
FIG. 5D is a top view of the communication patch panel system of FIG. 5B in the second position.

Proximal arms 405 and distal arms 415 may serve to guide transition of the patch panel device 410 between a first position (FIG. 5B) and second position (FIG. 5D), and may also serve as support mechanisms for holding the patch panel device 410. Patch panel device 410 may be coupled to one proximal arm 405 on top, one proximal arm 405 below, or both. The distal arms 415 may have the same configuration (e.g., one above, one below, or one above and one below patch panel device 410). In one embodiment, unhindered access to the proximal face of the device 410 is provided in the second position (FIG. 5D), and a portion 432 of tray 431 may continuously be within the housing 402 throughout operation (i.e., at all positions) of the system 400. Portion 432 of tray 431 is best illustrated in FIG. 5D. At least part of tray portion 432 may include a smooth sheet or plate, similar to that described above in relation to tray portion 332.

The communication patch panel system 400 may include a cable retainer 412 attached at or near the second pivot point R2 of the distal arm 415. The retainer 412 may be shaped and positionable with the tray 432 relative to the distal side of the housing 402, such that at any position of the retainer 412, any portion of a cable C extending along or in tension against the retainer 412 has at least a minimum radius of curvature, thereby avoiding damage to the cable C and/or maintaining a desired level of optical energy transmittance through the cable C. The retainer 412 may have an outer surface that is substantially smooth or may be rotatably mounted to second pivot point R2, or both, in order to avoid friction between the cable C and the retainer 412 when the cable C moves along or over the outer surface of the retainer 412.

In an exemplary operation, tray 431 may be pulled from the housing 402 in direction Z. The movement of the tray 431 may be guided by a side wall 402a and the paths of motion of the proximal and distal arms 405, 415. The proximal arm 405 may guide movement of the tray 431 in a manner similar to that described in connection with arms 305. Further, the distal arms 415 may guide movement of the tray 431, guided by the counterclockwise rotation of the distal arm segment 417 about first pivot point R1 and the clockwise rotation of the proximal arm segment 416 about second pivot point R2. As shown in FIGS. 5C-D, tray 431 may be pulled from housing 402 a sufficient distance in direction Z to clear any obstruction, such as may be caused by the side wall 402a or the rack pole 404, to a pivot path illustrated by path V, at which point the tray 431 may move clockwise along path V to the second position (FIG. 5D), guided substantially by the clockwise rotation of tray 431 about the pivot points at which tray 431 is connected to proximal and distal arms 405, 415.

When the tray 431 is transitioned to the first position (FIG. 5B) from the second position (FIG. 5D), the tray 431 may first rotate counterclockwise about the pivot points connecting tray 431 to proximal and distal arms 405, 415, which guide the tray 431 along the path V in a counterclockwise direction. Once tray 431 is rotated to a position so opposing sides of the tray 431 are substantially longitudinally aligned with the opposing sides of the housing 402, the tray 431 may be pushed into housing 402 in a direction opposite direction Z, guided by the proximal and distal arms 405, 415.

Figure 6A:
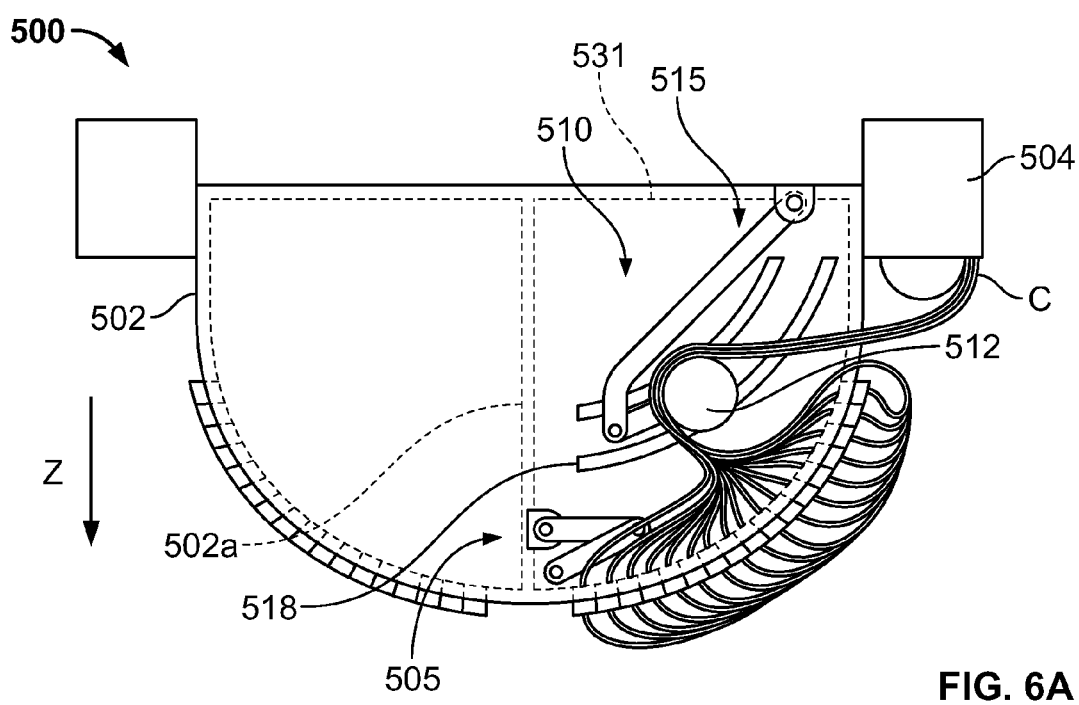
FIG. 6A is a top view of another embodiment of a communication patch panel system incorporating a cable management system in a first position coupled to a patch panel device.
Figure 6B:
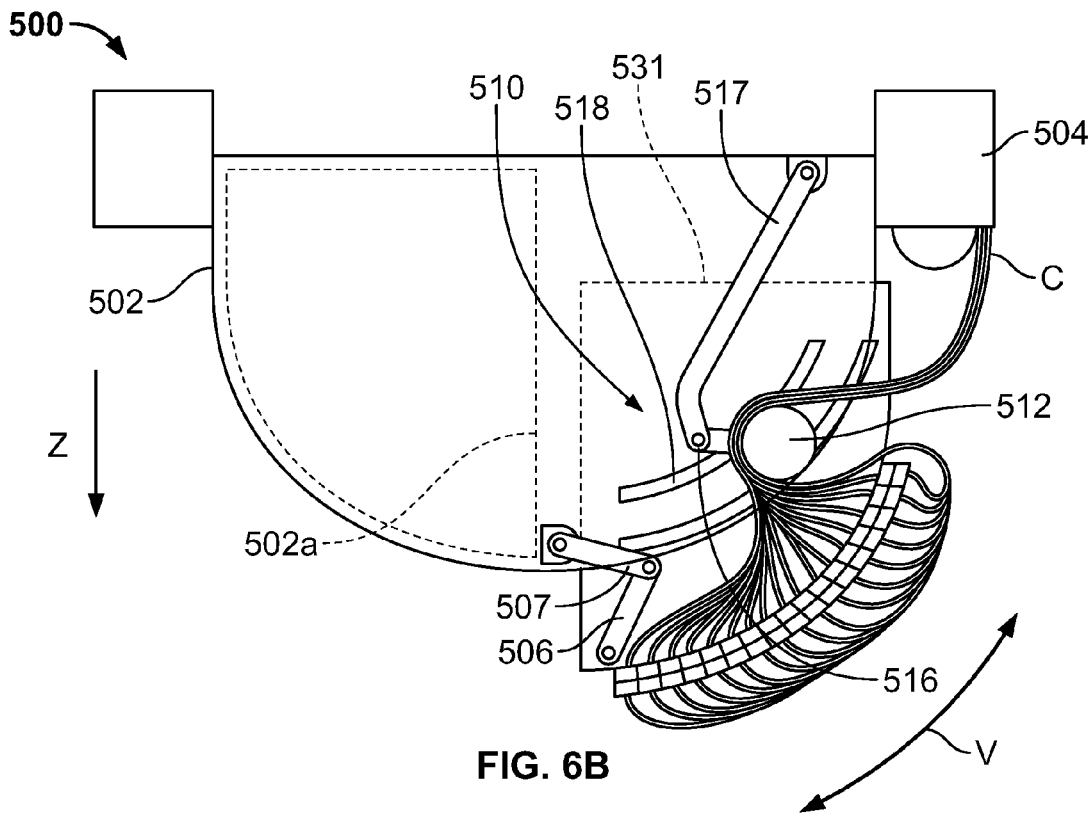
FIG. 6B is a top view of the communication patch panel system of FIG. 6A at a transition position between the first position and a second position.
Figure 6C:
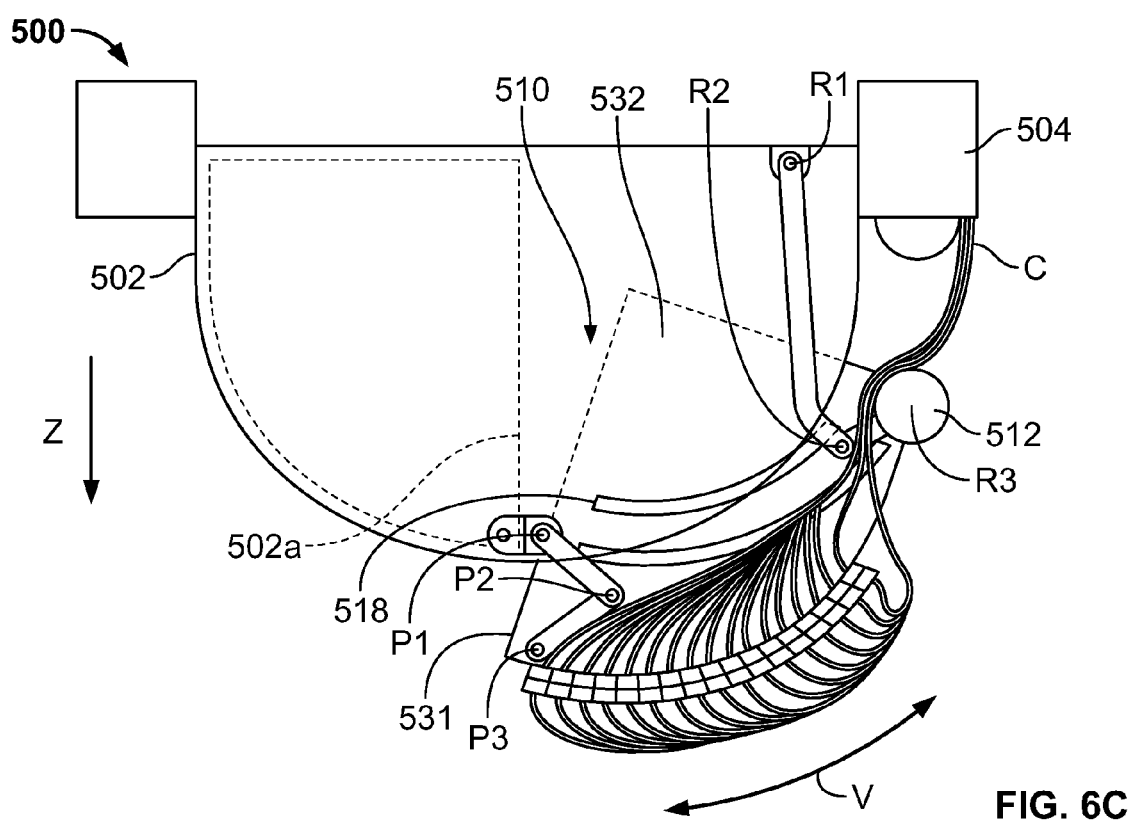
FIG. 6C is a top view of the communication patch panel system of FIG. 6A in the second position.

A third embodiment of a communication patch panel system 500 incorporating a cable management system is illustrated in FIGS. 6A-C. Communication patch panel system 500 may include a housing 502 identical in most or all respects to housing 402. For example, housing 502 may include one or more proximal arms 505 and one or more distal arms 515 identical in structure and function to proximal arms 405 and distal arms 415.

Proximal arms 505 operate substantially similar to arms 305; each proximal arm 505 may include a proximal segment 506 and distal segment 507, with first, second, and third pivot points P1, P2, and P3. The proximal arm 505 is pivotally attached to a proximal portion of the housing 502 at the first pivot point P1 through a connection rod extending through the distal segment 507 at the point P1 and a hole of a flange extending from the proximal side of the housing 502. The proximal and distal segments 506, 507 are pivotally engaged with each other at the second pivot point P2. The proximal arm 505 is pivotally attached to a proximal portion of the patch panel device 510 at the third pivot point P3, such as by a bolt extending through the proximal arm 505 at the point P3 and then fixed to (and also extending through) the tray 531. Additionally, the proximal arms 505 may include a limiting means substantially identical to limiting means 309 described in connection with arm 305.

Each distal arm 515 may include a proximal segment 516 and a distal segment 517. The distal arms 515 may each include first, second, and third pivot or rotation points R1, R2 and R3. The distal arm 515 may be pivotally attached to a distal portion of the housing 502 at the first pivot point R1 through a connection rod extending through the distal segment 517 at the point R1 and a hole of a flange extending from the distal side of the housing 502. The proximal and distal segments 516, 517 may be pivotably engaged with each other at the second pivot point R2. The distal arm 515 may also be engaged at the point R2 with an arcuate rail 518 such that the distal arm 515 is moveable along the length of the rail 518. The rail 518 may be fixedly attached to the tray 531, and desirably is attached to a distal portion of the tray 531. Additionally, the distal arms 515 may include a limiting means similar to the means discussed above to control the range of motion at the first and second pivot points R1, R2 in order to ensure proper transition of the patch panel device 510 from the first position (FIG. 6A) to the second position (FIG. 6C), and vice versa.

In addition to guiding the device 510 between a first position (FIG. 6A) and second position (FIG. 6C), the proximal and distal arms 505, 515 serve as support mechanisms for holding the device 510. In one embodiment, unhindered access to the proximal face of the device is provided in the second position (FIG. 6C), and a portion 532 of tray 531 may continuously be within the housing 502 throughout operation (i.e., at all positions) of the communication patch panel system 500. Tray portion 532 is best illustrated in FIG. 6C. Thus, to provide further support to the device 510 when in the second position, at least part of the portion 532 of tray 531 may include a smooth sheet or plate, similar to the plate described above in connection with trays 331 and 431.

The cable management system of patch panel communication system 500 may include a cable retainer 512 attached to the distal arm 515 at or near the third pivot point R3. The retainer 512 may be shaped and positionable with the tray 531 relative to the distal side of the housing 502, such that at any position of the retainer 512, any portion of a cable C extending along or in tension against the retainer 512 has at least a minimum radius of curvature, thereby avoiding damage to the cable C and/or maintaining a desired level of optical energy transmittance through the cable C. The retainer 512 may have an outer surface that is substantially smooth or may be rotatably mounted to third pivot point R3, or both, in order to avoid friction between the cable C and the retainer 512 when the cable C moves along or over the outer surface of the retainer 512.

In an exemplary operation, tray 531 may be pulled from the housing 502 in direction Z. The movement of the tray 531 may be guided by a side wall 502a and the paths along which the proximal and distal arms 505 and 515 move. The proximal arm 505 may guide movement of the tray 531, guided by the clockwise rotation of the distal arm segment 507 about first pivot point P1 and counterclockwise rotation of the proximal arm segment 506 about second pivot point P2. Further, the distal arm 515 may guide movement of the tray 531, guided by the counterclockwise rotation of the distal arm segment 517 about first pivot point R1 and movement of the proximal arm segment 516 at second pivot point P2 along the path defined by the arcuate rail 518. As shown in FIGS. 6B-C, tray 531 may be pulled from housing 502 a sufficient distance in direction Z to clear any obstruction, such as may be caused by the side wall 502a or the rack pole 504, to a pivot path illustrated by path V, at which point the tray 531 may move clockwise along path V to the second position (FIG. 6C), guided substantially by the clockwise rotation of tray 531 about the proximal third pivot point P3, and the movement of point R2 of the distal arm 515 along the length of the arcuate rail 518.

When the tray 531 is transitioned to the first position (FIG. 6A) from the second position (FIG. 6C), the tray 531 may first rotate counterclockwise about third pivot point P3, where such rotational movement is guided by movement of the proximal arm segment 515 at the second pivot point R2 along the arcuate rail 518, which guides the tray 531 counterclockwise along the path V. Once tray 531 is rotated to a position so opposing sides of the tray are substantially longitudinally aligned with the opposing sides of the housing 502, the tray 531 may be pushed into housing 502 in a direction opposite direction Z, guided by the proximal and distal arms 505, 515 and the arcuate rail 518.

Figure 7A:
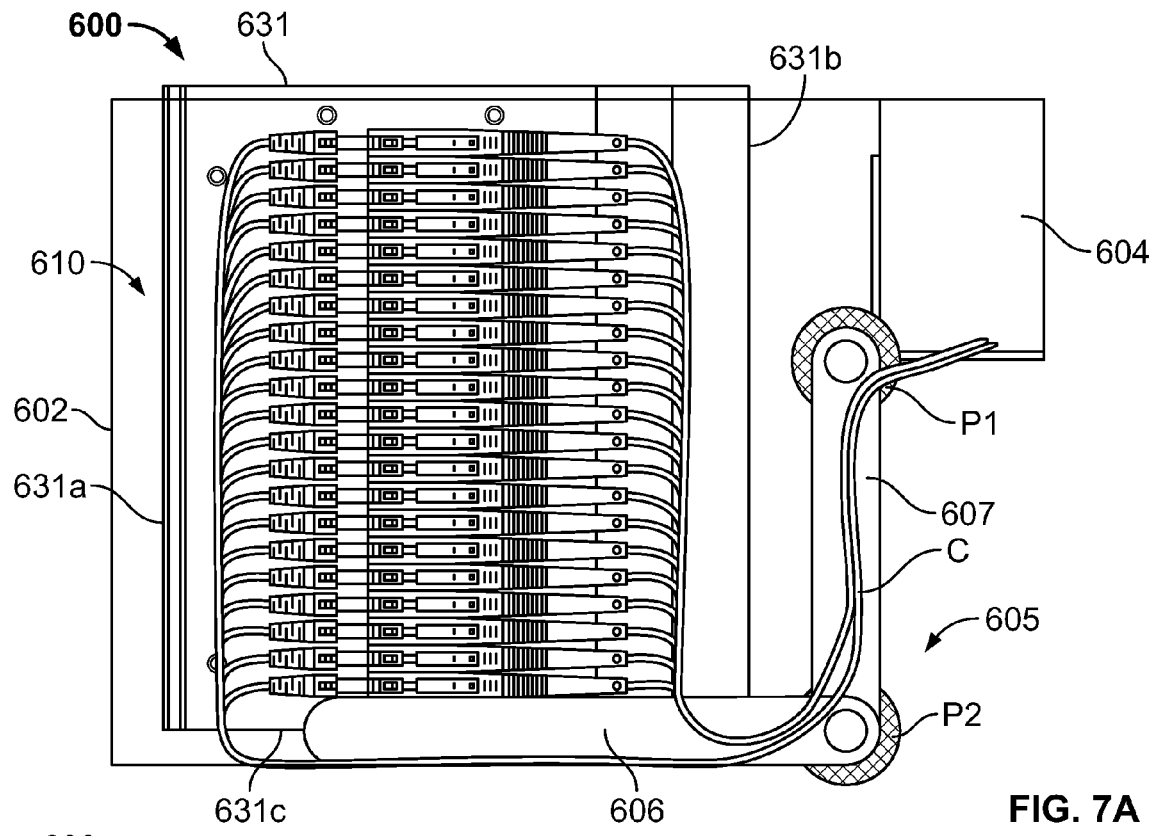
FIG. 7A is a top view of a further embodiment of a communication patch panel system incorporating a cable management system in a first position coupled to a patch panel device.
Figure 7B:
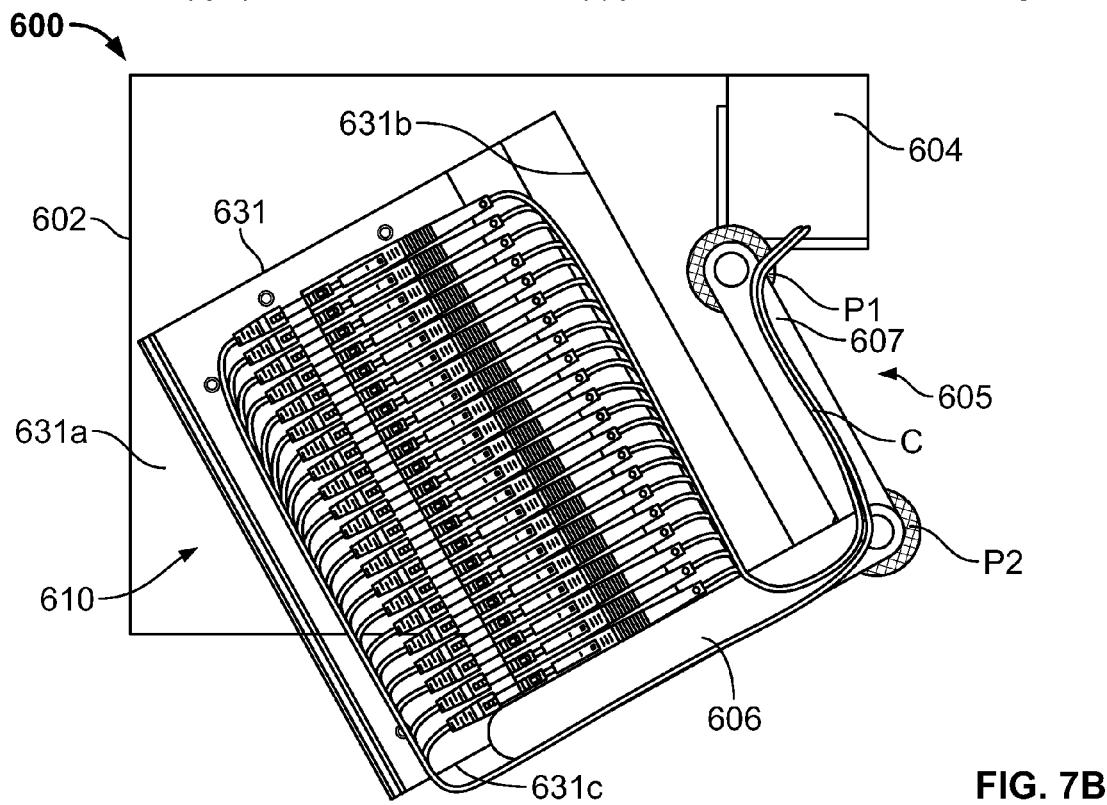
FIG. 7B is a top view of the communication patch panel system of FIG. 7A at a transition position between the first position and a second position.
Figure 7C:
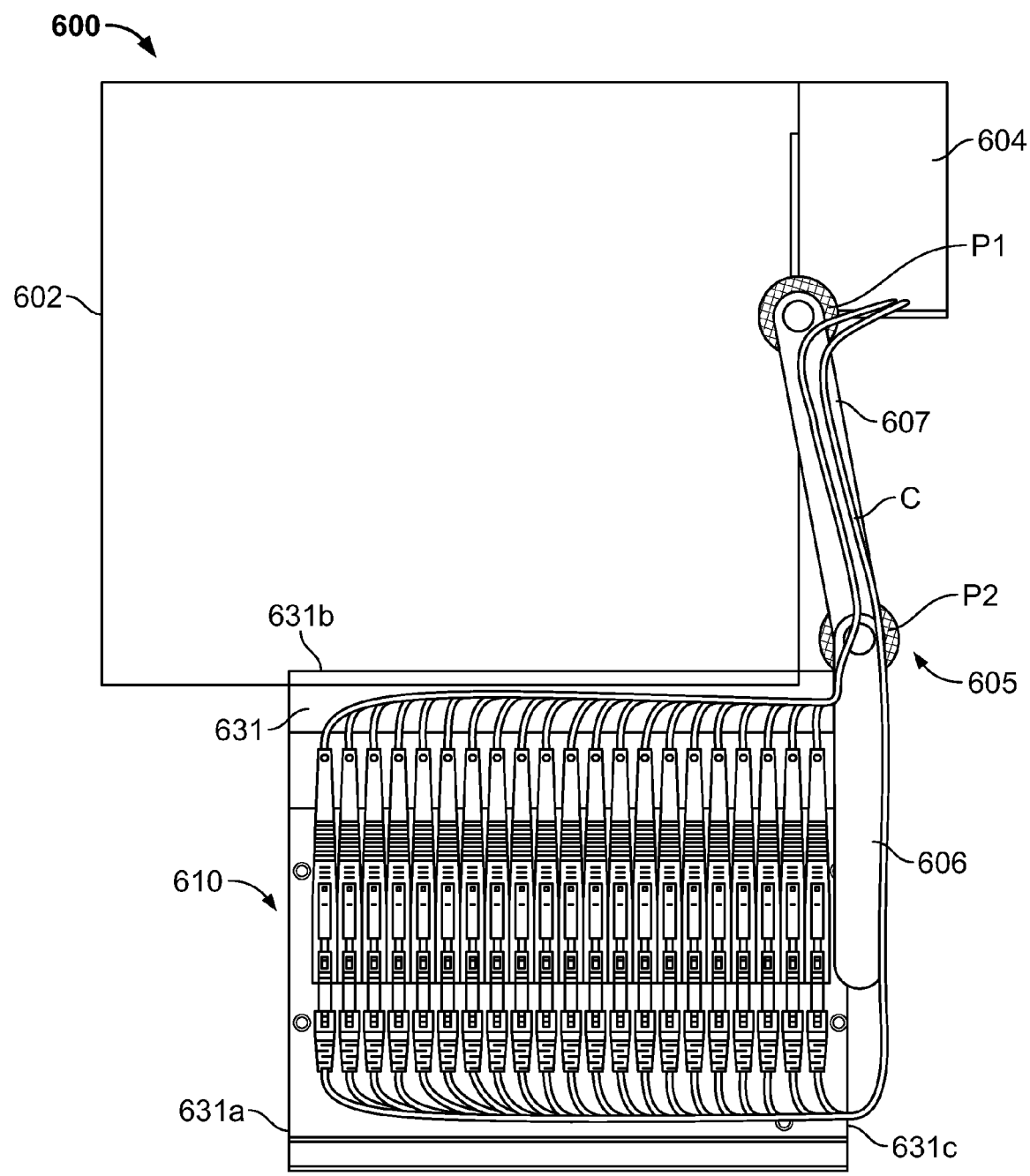
FIG. 7C is a top view of the communication patch panel system of FIG. 7A in the second position.

Another communication patch panel system 600 incorporating a cable management system is illustrated in FIGS. 7A-C. The cable management system of communication patch panel system 600 may be coupled to a patch panel device 610 having a tray 631 with a proximal portion 631*a* and a distal portion 631*b*. Patch panel device 610 may be similar or identical to patch panel device 210 of FIGS. 3A-D, although other types of patch panel devices may be suitable for use with system 600. Generally, the cable management system of communication patch panel system 600 allows the patch panel device 610 to transition from a first position (FIG. 7A), through a range of intermediate positions (FIG. 7B), and to a second position (FIG. 7C), which corresponds to movement of the tray 631 from a first position within the housing 602 to a second position substantially outside of the housing 602, at which position the tray 631 is disposed a maximum distance away from the distal side of the housing 602. The first position (FIG. 7A) may allow for organized storage of the cables C within the housing 602, whereas the second position (FIG. 7C) may allow for convenient access to the cables C when the tray 631 is pulled from the housing 602. Communication patch panel system 600 may include an arm 605 adapted to pivotably engage the patch panel device 610 and housing 602. The arm 605 may include a distal segment 607 pivotally engaged with the rack pole 604 and a proximal segment 606 engaged with the device 610. The arm 605 may include a first pivot point P1 and a second pivot point P2, and may be pivotably engaged to the rack pole 504 at the first pivot point P1. One end of the proximal segment 606 may be pivotably engaged with the distal segment 607 at the second pivot point P2. A length of the proximal segment 606 extending away from the end of the proximal segment 606 engaged with the distal segment 607 may be fixedly attached to a side 631*c* of the tray 631. Additionally, the arm 605 may include a limiting means (not shown) to control the range of motion at each pivot point P1, P2 similar or identical to limiting means 309.

Figure 7D:
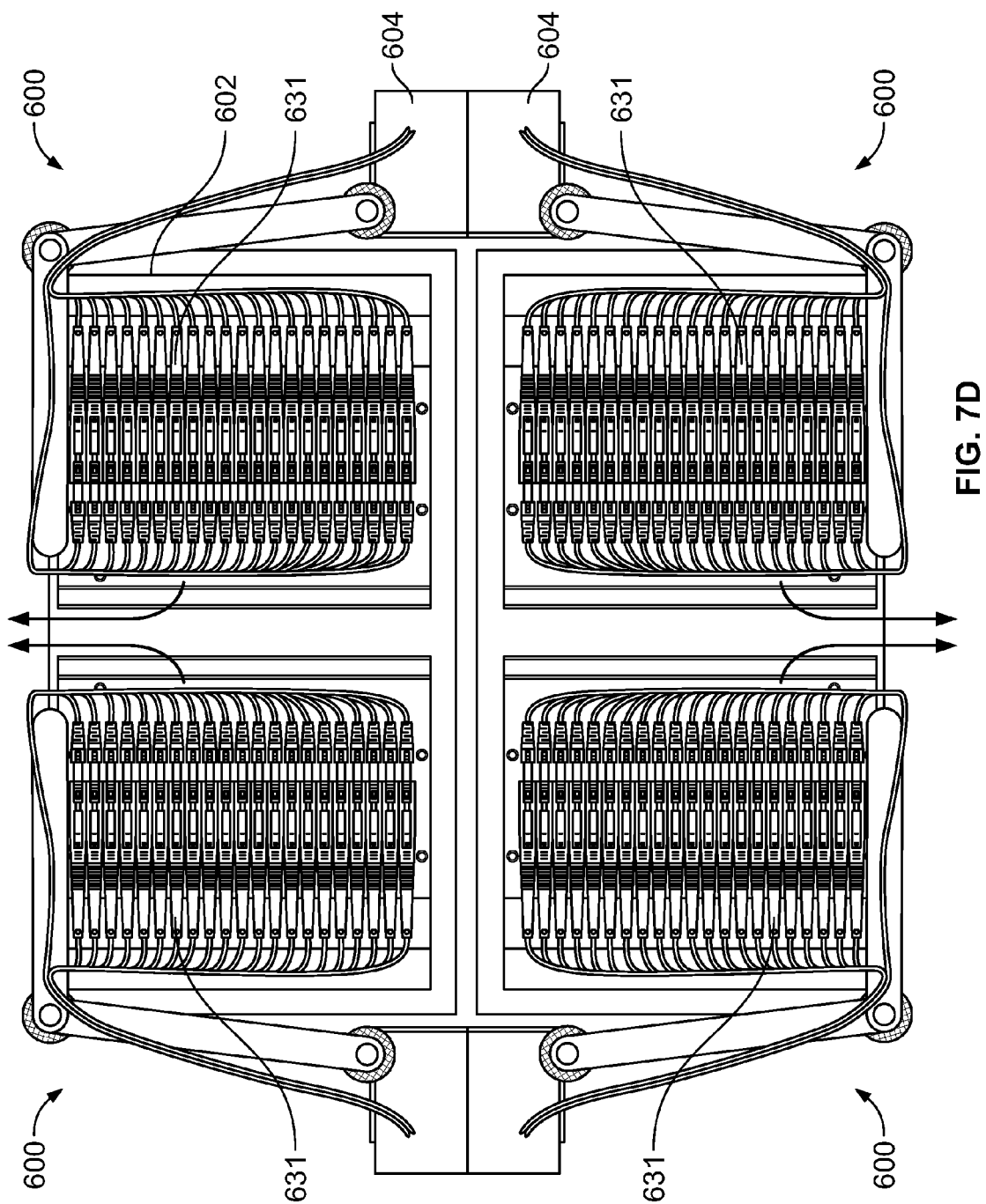
FIG. 7D is a top view of an exemplary arrangement of four of the communication patch panel systems of FIGS. 7A-7C placed together.

In an exemplary operation, tray 631 may be rotated counterclockwise about the first pivot point P1 from the first position (FIG. 7A) without the proximal segment 606 rotating about pivot point P2, until the housing 502 does not obstruct the tray 631 from rotating counterclockwise about the second pivot point P2 so the tray 631 obtains a clearance position. At such clearance position, the tray 631 may be further rotated counterclockwise about the second pivot point P2 and also rotated counterclockwise about the first pivot point P1 to obtain the second position (FIG. 7C). The tray 631 may be transitioned from the second position (FIG. 7C) to the first position (FIG. 7A) via substantially the same movements in opposite order. FIG. 7D illustrates a top view of a plurality of communication patch panel systems 600 within a housing 602, each tray 631 being in the first, stored position.

In addition to guiding movement of the device 610 such that the device 610 may transition between a first position (FIG. 7A) and second position (FIG. 7C), the arm 605 may serve as a support mechanism for the cables C and for the device 610. Unhindered access to the proximal face of the device 610 may be provided in the second position, and a distal portion of the tray 631*b* may continuously be within the housing 602 throughout operation of the communication patch panel system 600. Thus, to provide further support to the device 610 when in the second position, at least part of the distal portion of the tray 631*b* may include a smooth sheet or plate, similar to the plates described above. In addition, cables C may be at least partially housed within arm 605. For example, at least a portion of the cables C may be mounted within the arm 605, such as along a track or within one or more retention devices. With this configuration, cables C may be protected during use and the amount of bending of cables C during movement of tray 631 minimized.

Another embodiment of a communication patch panel system 700 incorporating a cable management system is shown in FIGS. 8A-D. The system 700 may include an arm 705 adapted to pivotally engage the patch panel device 710 and a housing 702. The arm 705 may include a distal segment 707 pivotably engaged with the rack pole 704 and a proximal segment 706 engaged with the device 710. The arm 705 may include a first pivot point P1 and second pivot point P2, and may be pivotably engaged to the rack pole 704 at the first pivot point P1. One end of the proximal segment 706 may be pivotably engaged with the distal segment 707 at the second pivot point P2. A length of the proximal segment 706 extending away from the end of the proximal segment 706 engaged with the distal segment 707 may be fixedly attached to a side 731*c* of a tray 731. Additionally, the arm 705 may include a limiting means (not shown) to control the range of motion at each pivot point P1, P2 similar or identical to limiting means described above. As described in connection with system 600, the cables C of system 700 may be at least partially positioned within arm 705 during operation.

Figure 8A:
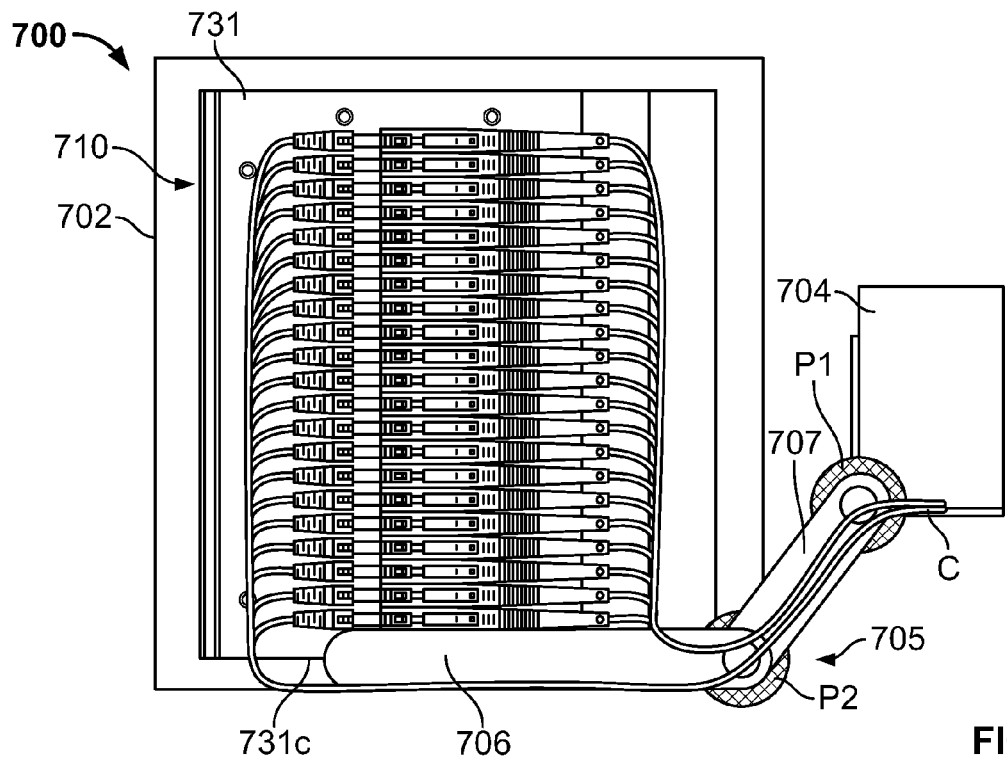
FIG. 8A is a top view of yet another embodiment of a communication patch panel system incorporating a cable management system in a first position coupled to a patch panel device.
Figure 8B:
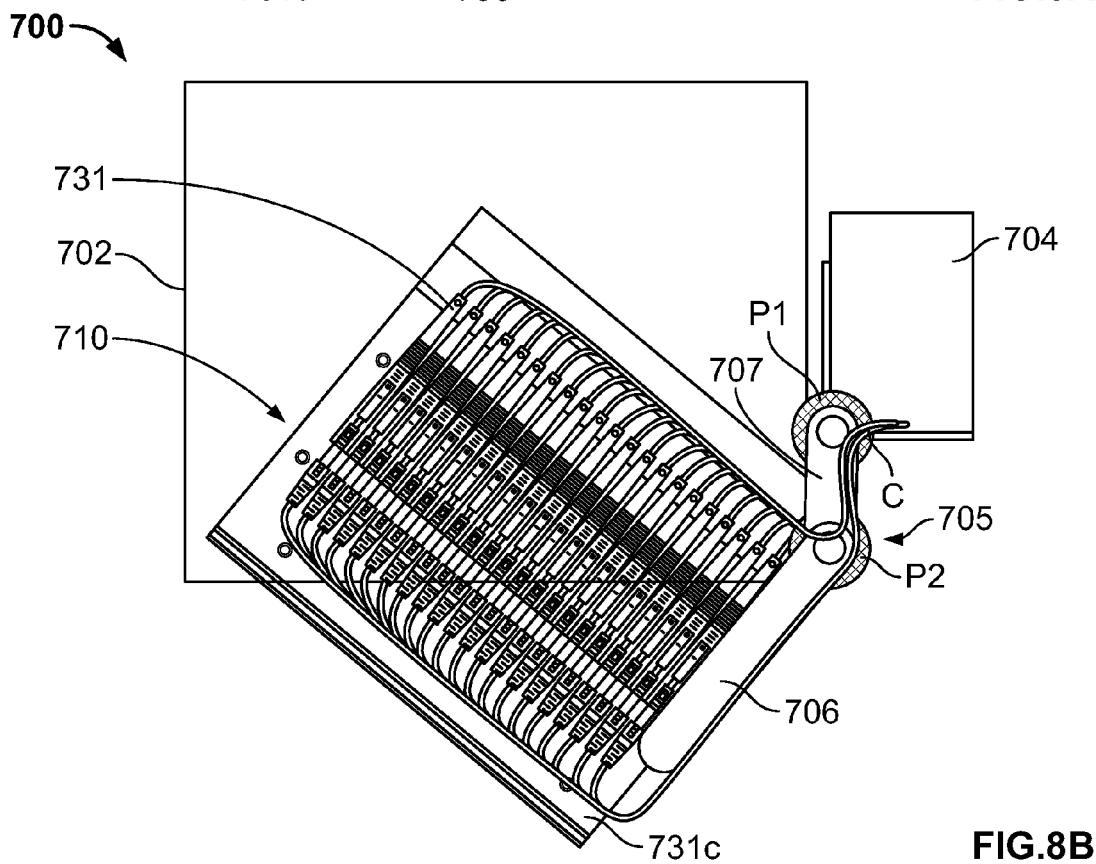
FIG. 8B is a top view of the cable management system of FIG. 8A at a transition position between the first position and a second position.
Figure 8C:
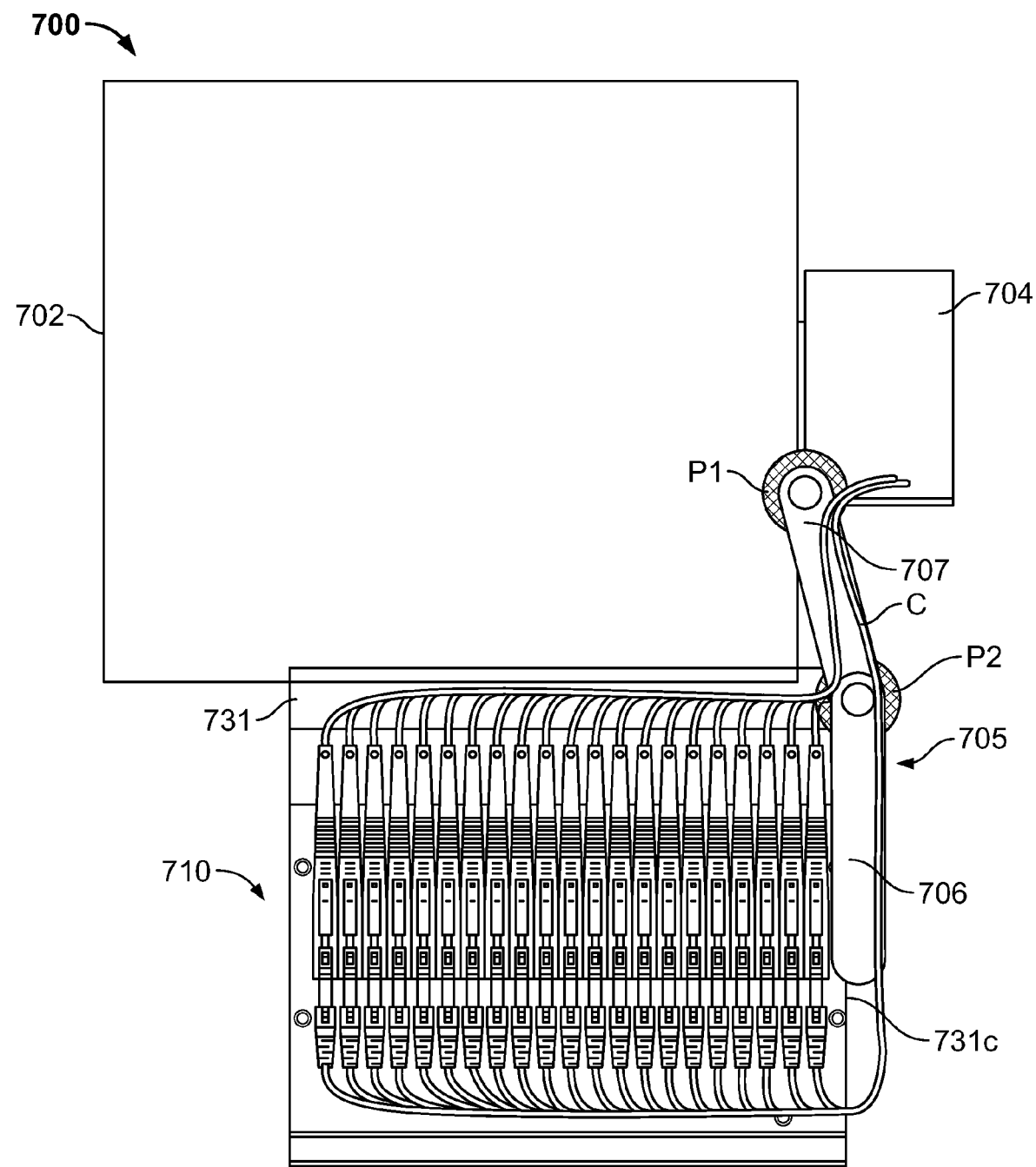
FIG. 8C is a top view of the cable management system of FIG. 8A in the second position.
Figure 8D:
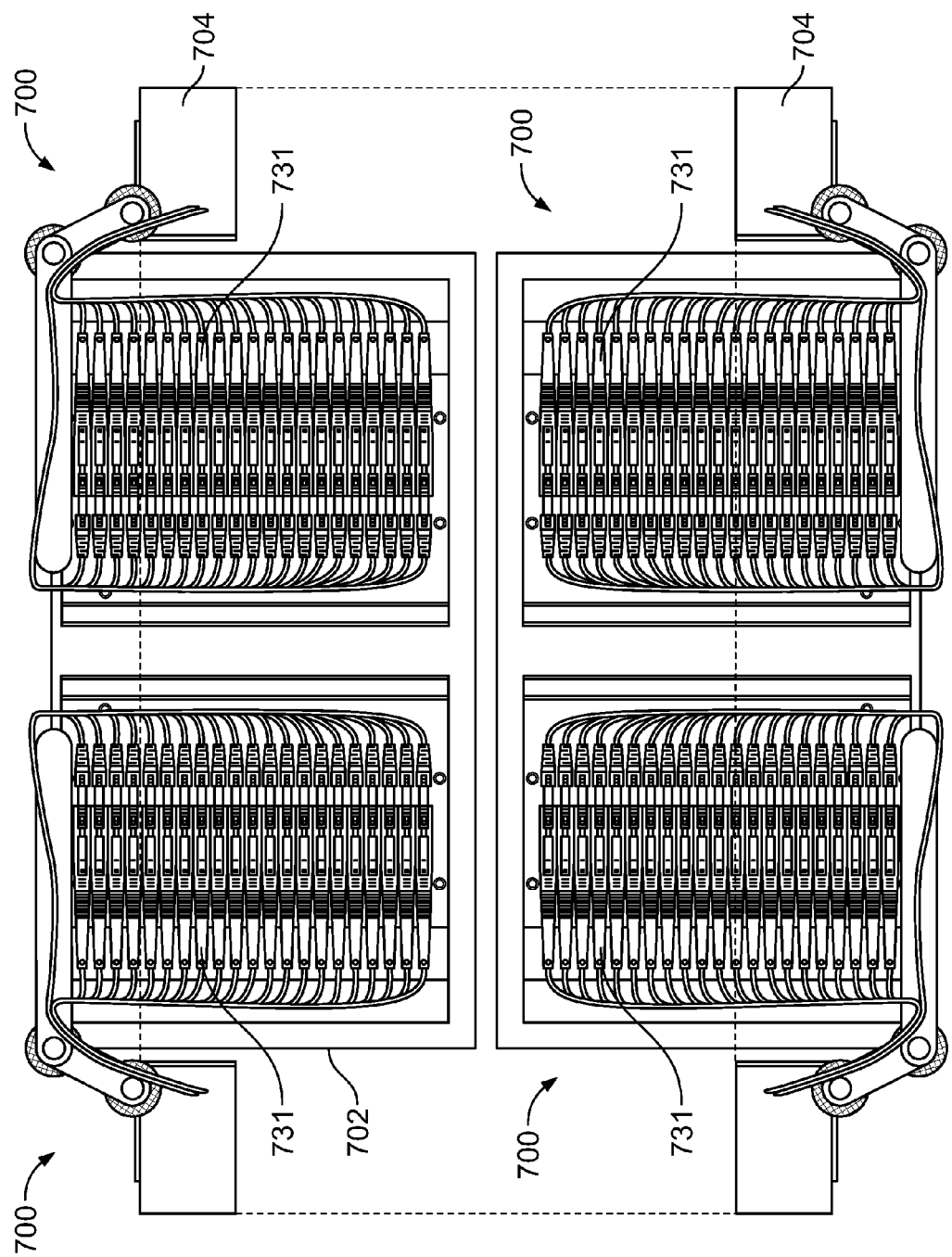
FIG. 8D is a top view of an exemplary arrangement of four of the communication patch panel systems of FIGS. 8A-C placed together.

In an exemplary operation, tray 731 may be rotated counterclockwise about the first pivot point P1 from the first position (FIG. 8A) with the proximal segment 706 optionally rotating about pivot point P2, until a lateral side of the housing 702 does not obstruct the tray 731 from rotating counterclockwise about the second pivot point P2, such that the tray 731 obtains a clearance position. Whether the proximal segment 706 may rotate about the pivot point P2 when the tray 731 transitions between the first position and the clearance position may depend on patch panel system design conditions including positioning of the rack pole 704 along the side of the housing 702, the length of the distal segment 707, the distance between the opposing sides of the housing 702, and the distance between the opposing sides of the tray 731. At the clearance position, the tray 731 may be further rotated counterclockwise about the second pivot point P2 and also rotated counterclockwise about the first pivot point P1 to obtain the second position (FIG. 8C). The tray 731 may be transitioned from the second position back to the first position via substantially the same steps performed in reverse order. FIG. 8D illustrates a top view of a plurality of communication patch panel systems 700 within a housing 702, each tray 731 being in the first, stored position.

It should be understood that system 600 may utilize the exemplary operation described for system 700, and vice versa. Thus, in some embodiments of system 600, the proximal segment 606 may optionally rotate about pivot point P2 while obtaining the clearance position from the first position, or vice versa. Accordingly, in some embodiments of system 700, the proximal segment 706 may not rotate about pivot point P2 while obtaining the clearance position from the first position (FIG. 7A), or vice versa.

Comparing the arrangement of systems 600 and 700 shown in FIGS. 7D and 8D, the system 600 differs from the system 700 at least in that the length of distal arm segment 707 is decreased compared to distal arm segment 607, in view of the proximal position of the rack pole 704 along a lateral side of housing 702, relative to the position of the rack pole 604 at the distal side of the housing 602. Thus, the system 600 may be used in connection with a housing, such as housing 602, where an arrangement of rack poles 604, such as within a room, is well-suited for the increased proximal space of housing 602 (FIG. 7D), whereas the system 700 may be used in connection with a housing, such as housing 702, where the arrangement of rack poles 704 is well-suited for the increased distal space of housing 702 (FIG. 8D). It is to be understood that, in accordance with the disclosure, the length of the distal arm segments 607, 707 may be adjusted accordingly, in view of the position of the rack pole 604 or 704 along the lateral side of the corresponding housing to which the system is to be connected, to provide for similar operation as described above for the system 600.

In any of the embodiments described herein, it is to be understood that any suitable connector may be used. For example, an LC type connector may be used. However, an LC connector is only one example of a small form connector that may be used. Differently sized connectors, whether larger or smaller may be used. As discussed above, connectors may be configured to be coupled to one or more cables, e.g., simplex or duplex. Specific connectors shown and described herein are merely illustrative embodiments. Connectors that are differently configured and/or sized may be utilized without deviating from the scope and spirit of the present invention.

In all of the embodiments described above, the communication patch panel systems may be provided as a single unit. However, it should be understood that the various components described herein may be installed coupled to any suitable patch panel device and/or housing to attain the functionalities described herein. For example, proximal arm 305 and cable retainer 312 may be installed coupled to an existing patch panel device to attain, for example, the rotational capability of tray 331 and the cable guiding functionality of cable retainer 312 during rotation of the tray 331. When such components are installed coupled to a patch panel device and/or housing, the components may be referred to as being in an installed state. The above concept applies to all embodiments described herein, and as should be clear, allows for providing systems with the above described functionality or providing specific components thereof for coupling to existing patch panel devices and/or housings.

Although the invention herein has been described with reference to particular embodiments, it is to be understood that these embodiments are merely illustrative of the principles and applications of the present invention. It is to be understood unless otherwise indicated herein that the figures are not intended to be to scale. It is therefore to be understood that numerous modifications may be made to the illustrative embodiments and that other arrangements may be devised without departing from the spirit and scope of the present invention as defined by the appended claims. For example, components of one embodiment described above may be added to, subtracted from, or substitute into other embodiments described above without departing from the scope of the invention.

The invention claimed is:

1. A communication patch panel apparatus comprising:
a support arm having a proximal segment and a distal segment pivotably coupled to the proximal segment, the distal segment for pivotably coupling to a rack pole of a housing and the proximal segment for fixing to a tray of a communication patch panel device having a plurality of ports configured to connect to cables, wherein the tray is engageable with the housing to have a first position within the housing and a second position pulled out of the housing;
wherein the apparatus is in an installed state when the support arm is coupled to the rack pole and fixed to the tray, and, when in the installed state, as the tray transitions from the first position to the second position, the tray and the support arm are capable of rotating with respect to the housing,
wherein the proximal segment includes a length portion extending from an end of the proximal segment at which the proximal segment is coupled to the distal segment, the length portion configured for fixedly coupling along a side of the tray from a distal end of the tray extending toward a proximal end of the tray.

2. The apparatus of claim 1, wherein the support arm includes a motion limiting mechanism configured to limit a range of motion of the proximal and distal segments of the support arm relative to one another.

3. The apparatus of claim 1, wherein the support arm includes a motion limiting mechanism configured to limit a range of motion of the distal segment of the support arm relative to the housing.

4. The apparatus of claim 1, wherein, as the tray is transitioned from the first position to the second position, the distal segment of the support arm is configured to rotate in a first direction relative to the housing without rotating relative to the proximal segment of the support arm, and, after the rotation of the distal segment of the support arm, the proximal segment of the support arm is configured to rotate with respect to the distal segment of the support arm.

5. The apparatus of claim 1, wherein at least a portion of the cables is positioned within a portion of the support arm.

6. A patch panel system comprising:
the housing and the at least one patch panel device; and
at least one patch panel apparatus according to claim 1 coupled to the housing and the at least one patch panel device.

7. The apparatus of claim 1, wherein the proximal and distal segments include one or more retention devices for mounting cables within the support arm.

* * * * *